US007167189B2

(12) United States Patent
Di Lelle et al.

(10) Patent No.: US 7,167,189 B2
(45) Date of Patent: Jan. 23, 2007

(54) THREE-DIMENSIONAL COMPOSITING

(75) Inventors: Juan Pablo Di Lelle, Montreal (CA); Michiel Schriever, Montreal (CA)

(73) Assignee: Autodesk Canada Co., Montreal (CA)

( * ) Notice: Subject to any disclaimer, the term of this patent is extended or adjusted under 35 U.S.C. 154(b) by 260 days.

(21) Appl. No.: 10/817,348

(22) Filed: Apr. 2, 2004

(65) Prior Publication Data

US 2004/0196299 A1    Oct. 7, 2004

(30) Foreign Application Priority Data

Apr. 2, 2003 (GB) ................................ 0307582.7

(51) Int. Cl.
    *G06T 15/00*     (2006.01)
(52) U.S. Cl. ..................................... 345/677
(58) Field of Classification Search ................. 345/419
    See application file for complete search history.

(56) References Cited

U.S. PATENT DOCUMENTS

| | | | |
|---|---|---|---|
| 4,488,245 A | 12/1984 | Dalke et al. |
| 4,524,421 A | 6/1985 | Searby et al. |
| 4,538,188 A | 8/1985 | Barker et al. |
| 4,558,302 A | 12/1985 | Welch |
| 4,602,286 A | 7/1986 | Kellar et al. |
| 4,641,255 A | 2/1987 | Hohmann |
| 4,666,271 A | 5/1987 | Gonsot |
| 4,677,576 A | 6/1987 | Berlin et al. |
| 4,771,342 A | 9/1988 | Beesley |
| 4,812,904 A | 3/1989 | Maring et al. |
| 4,823,108 A | 4/1989 | Pope |
| 4,935,816 A | 6/1990 | Faber |
| 5,077,610 A | 12/1991 | Searby et al. |
| 5,091,963 A | 2/1992 | Litt et al. |
| 5,212,544 A | 5/1993 | Kellar et al. |

(Continued)

FOREIGN PATENT DOCUMENTS

CA        2066989        10/1992

(Continued)

OTHER PUBLICATIONS

Little, T.D.C., "Time-based Media Representation and Delivery," Multimedia Systems, J.F. Koegel Buford, ed., ACM Press, New York, 1994, pp. 175-200.

(Continued)

*Primary Examiner*—Mark Zimmerman
*Assistant Examiner*—Andrew Yang
(74) *Attorney, Agent, or Firm*—Gates & Cooper LLP

(57) ABSTRACT

An apparatus for generating image data is provided which comprises memory means, display means, user input means, and processing means, wherein said memory means stores said image data and instructions and said instructions configure said processing means to perform the steps of defining first image data, as a first layer having respective co-ordinates within a three-dimensional volume configured with a reference co-ordinate system; upon selecting second image data as a second layer to composite with said first layer, generating a reference pose layer and configuring the co-ordinates thereof as a second reference co-ordinate system within said volume; positioning said reference pose layer relative to said first layer; and defining said second image data as said second layer having respective co-ordinates within said three-dimensional volume configured with said second reference co-ordinate system.

12 Claims, 18 Drawing Sheets

U.S. PATENT DOCUMENTS

| | | |
|---|---|---|
| 5,216,755 A | 6/1993 | Walker et al. |
| 5,289,566 A | 2/1994 | Walker et al. |
| 5,319,465 A | 6/1994 | Squyres et al. |
| 5,335,293 A | 8/1994 | Vannelli et al. |
| 5,357,294 A | 10/1994 | Shimizu et al. |
| 5,359,430 A | 10/1994 | Zhang |
| 5,384,667 A | 1/1995 | Beckwith |
| 5,392,072 A | 2/1995 | Rodriguez et al. |
| 5,398,120 A | 3/1995 | Friedman et al. |
| 5,420,801 A | 5/1995 | Dockter et al. |
| 5,428,723 A | 6/1995 | Ainscow et al. |
| 5,428,731 A | 6/1995 | Powers, III |
| 5,430,878 A | 7/1995 | Straub et al. |
| 5,434,958 A | 7/1995 | Surma et al. |
| 5,442,751 A | 8/1995 | Patrick et al. |
| 5,455,600 A | 10/1995 | Friedman et al. |
| 5,459,529 A | 10/1995 | Searby et al. |
| 5,467,441 A * | 11/1995 | Stone et al. ............... 345/619 |
| 5,608,849 A * | 3/1997 | King, Jr. .................... 345/419 |
| 5,659,382 A | 8/1997 | Rybczynski |
| 5,659,793 A | 8/1997 | Escobar et al. |
| 5,687,011 A | 11/1997 | Mowry |
| 5,737,456 A | 4/1998 | Carrington et al. |
| 5,786,824 A | 7/1998 | Sevigny |
| 5,809,179 A | 9/1998 | Marimont et al. |
| 5,841,437 A * | 11/1998 | Fishkin et al. ............. 345/619 |
| 5,856,665 A | 1/1999 | Price et al. |
| 5,892,506 A | 4/1999 | Hermanson |
| 6,266,068 B1 * | 7/2001 | Kang et al. ................ 345/629 |
| 6,269,180 B1 | 7/2001 | Sevigny |

FOREIGN PATENT DOCUMENTS

| | | |
|---|---|---|
| EP | 0 360 599 A2 | 3/1990 |
| EP | 0 532 883 A1 | 3/1993 |
| WO | WO 87/02852 | 5/1987 |
| WO | WO 93/14591 | 7/1993 |
| WO | WO 95/20292 | 7/1995 |

OTHER PUBLICATIONS

Alpert, S.R. et al., "The EFX Editing and Effects Environments," IEEE Multimedia, Spring 1996, pp. 15-29.

Sephton, A.J. et al., "Segmentation of Synthetic-Aperture Radar imagery of sea ice," International Journal of Remote Sensing, vol. 15, No. 4, pp. 803-825, 1994.

* cited by examiner

THREE-DIMENSIONAL COMPOSITING

CROSS-REFERENCE TO RELATED APPLICATIONS

This application claims the benefit under 35 U.S.C. §119 of the following co-pending and commonly assigned foreign patent application, which application is incorporated by reference herein:

United Kingdom Application No. 03 07 582.7, entitled "THREE-DIMENSIONAL COMPOSITING", by Juan Pablo di Lelle and Michiel Schriever, filed on Apr. 2, 2003.

This application is related to the following commonly assigned patent applications, all of which applications are incorporated by reference:

U.S. patent application Ser. No. 08/617,400, entitled "MULTITRACK ARCHITECTURE FOR COMPUTER-BASED EDITING OF MULTIMEDIA SEQUENCES", by David Hermanson, filed Mar. 18, 1996 (now U.S. Pat. No. 5,892,506 issued Apr. 6, 1999);

U.S. patent application Ser. No. 08/630,131, entitled "PROCESSING IMAGE DATA", by Benoit Sevigny, filed Apr. 10, 1996 (now U.S. Pat. No. 5,786,824 issued Jul. 28, 1998); and U.S. patent application Ser. No. 08/827,641, entitled "METHOD AND APPARATUS FOR COMPOSITING IMAGES", by Benoit Sevigny, filed Apr. 9, 1997 (now U.S. Pat. No. 6,269,180 issued Jul. 31, 2001).

FIELD OF THE INVENTION

The present invention relates to processing image frames for the compositing thereof. More particular, the present invention relates to positioning said image frames within a compositing volume for the compositing thereof.

DESCRIPTION OF THE RELATED ART

Systems for processing image data, having a processing unit, storage devices, a display device and manually-operable devices (such as a stylus and touch-tablet combination) are shown in U.S. Pat. Nos. 5,892,506, 5,786,824 and 6,269,180 all assigned to the present Assignee. In these aforesaid systems, it is possible to perform many processing functions upon stored image data in response to an artist manually selecting said functions by means of said input devices.

Most such systems according to the known prior art provide an artist with a two-dimensional compositing environment, wherein interaction with said image data is constrained to the X,Y screen co-ordinate system because said image data is traditionally two-dimensional image frames captured and digitized from field. Within this context, compositing involves for instance the keying of a foreground frame portraying talent filmed against a blue or green saturated background with a background frame portraying an alternative environment or location, in order to replace said blue or green environment with said alternative location in a final composite frame. Such a composite frame may at times involve many superimposed foreground and background frames, whereby each of said image frames is defined as a discreet layer of a figurative stack of layers representing the totality of said foreground and background frames, such that said artist may effectively identify, select and interact with each such discreet layer, thus overcoming the lack of a third z-dimension of the compositing environment.

Recently, in such systems as "Toxic" licensed by the present Assignee, the traditional 2-D compositing environment has been replaced with a three-dimensional compositing volume defined by a X,Y,Z canonical co-ordinate system in order to facilitate the interaction of said artist with the depth of a stack of foreground and background image frames. Moreover, film editing increasingly requires said artists to not only composite image frames but also computer-generated three-dimensional objects are characters in a final composite frame.

An important problem has however arisen form this dimensional paradigm shift, in that although three-dimensional object modeling and animation techniques have long been performed in systems such as "3-DS MAX" licensed by the present Assignee, such techniques require a skill set substantially different from the skill set of a compositing artist long-used to work within a two dimensional environment.

More particularly, such compositing artists are used to manipulating image frames by means of a X,Y two-dimensional translation only in a 2-D compositing environment, whereas manipulation of such image frames in a three-dimensional compositing environment now involves further transformations such as rotation, scaling and shearing. With regard to the number of distinct image layers required in modern film compositing, the respective positioning of each of said layers having to be precisely positioned relative to one another can become a time sink if the compositing artist lacks the required three-dimensional manipulation skills that are part of the 3-D artist skill set. What is therefore required is an apparatus and method for simplifying the positioning of image frames within such three-dimensional compositing environment.

BRIEF SUMMARY OF THE INVENTION

According to an aspect of the present invention, there is provided an apparatus for generating image data comprising memory means, display means, user input means and processing means, wherein said memory means stores said image data and instructions and said instructions configure said processing means to perform the steps of: defining first image data as a first layer having respective co-ordinates within a three-dimensional volume configured with a reference co-ordinate system; upon selecting second image data as a second layer to composite with said first layer, generating a reference pose layer and configuring the co-ordinates thereof as a second reference co-ordinate system within said volume; positioning said reference pose layer relative to said first layer; and defining said second image data as said second layer having respective co-ordinates within said three-dimensional volume configured with said second reference co-ordinate system.

According to a second aspect of the present invention, there is provided a method of generating image data comprising an apparatus for generating image data comprising memory means, display means, user input means and processing means, wherein said memory means stores said image data and instructions and said instructions configure said processing means to perform the steps of: defining first image data as a first layer having respective co-ordinates within a three-dimensional volume configured with a reference co-ordinate system; upon selecting second image data as a second layer to composite with said first layer, generating a reference pose layer and configuring the co-ordinates thereof as a second reference co-ordinate system within said volume; positioning said reference pose layer relative to said first layer; and defining said second image data as said second layer having respective co-ordinates within said three-dimensional volume configured with said second reference co-ordinate system.

WRITTEN DESCRIPTION OF THE BEST MODE FOR CARRYING OUT THE INVENTION

FIG. 1

Figure 1:
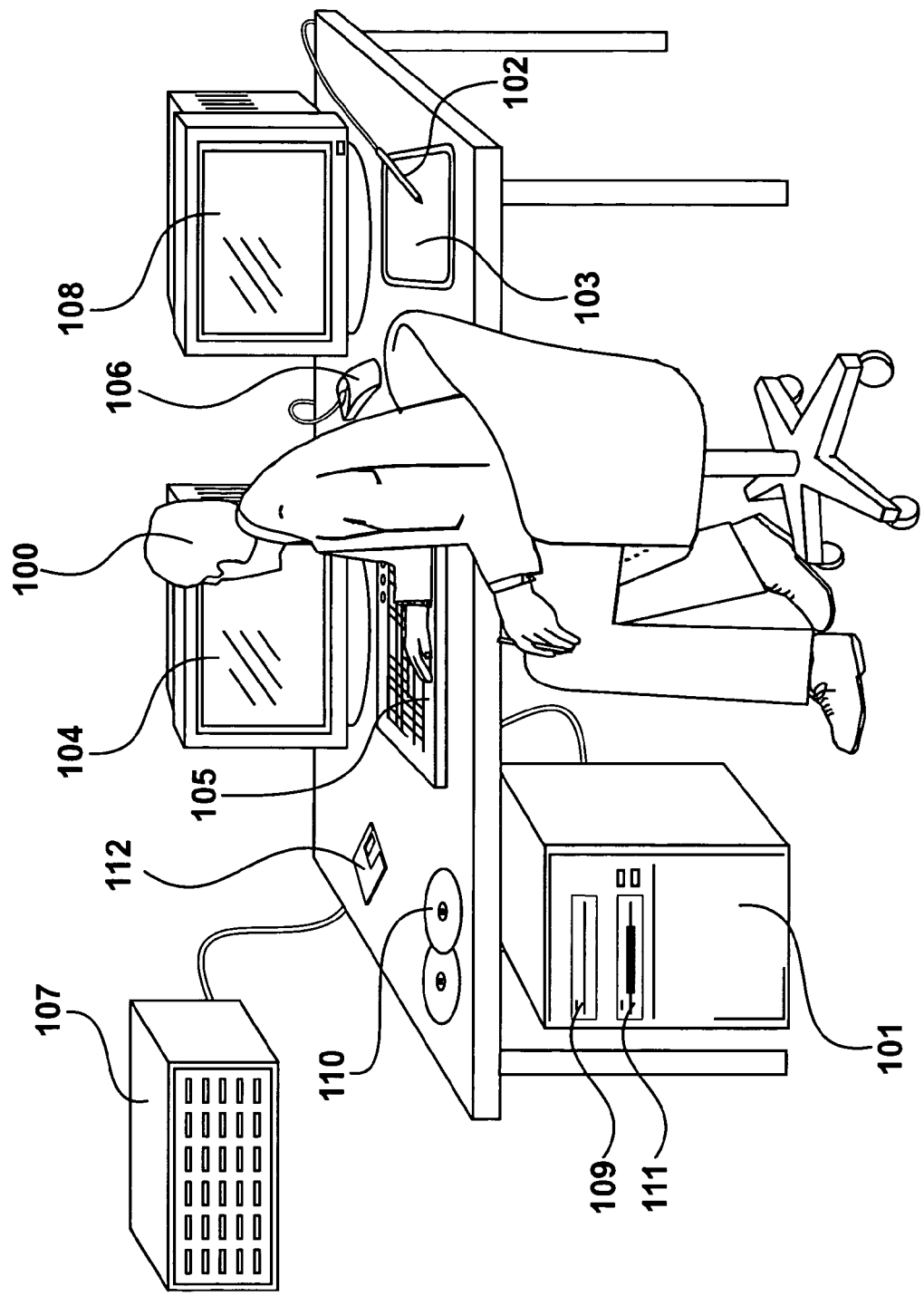
FIG. 1 shows a computer editing system, including a computer system video display unit and a broadcast-quality monitor.

A computer editing system, including a computer system video display unit and a high-resolution monitor, is shown in FIG. 1.

In the system shown in FIG. 1, instructions are executed upon a graphics workstation operated by a compositing artist 100, the architecture and components of which depends upon the level of processing required and the size of images being considered. Examples of graphics-based processing systems that may be used for very-high-resolution work include an ONYX II manufactured by Silicon Graphics Inc, or a multiprocessor workstation 101 manufactured by IBM Inc. The processing system 101 receives instructions from an artist by means of a stylus 102 applied to a touch tablet 103, in response to visual information received by means of a visual display unit 104. In addition, data may be supplied by said artist via a keyboard 105 or a mouse 106, with input source material being received via a real-time digital video recorder or similar equipment configured to supply high-bandwidth frame data.

The processing system 101 includes internal volatile memory in addition to bulk, randomly-accessible storage, which is provided by means of a RAID disk array 107, also known as a framestore. Output material may also be viewed by means of a high-quality broadcast monitor 108. System 101 includes an optical data-carrying medium reader 109 to allow executable instructions to be read from a removable data-carrying medium in the form of an optical disk 110, for instance a DVD-ROM. In this way, executable instructions are installed on the computer system for subsequent execution by the system. System 101 also includes a magnetic data-carrying medium reader 111 to allow object properties and data to be written to or read from a removable data-carrying medium in the form of a magnetic disk 112, for instance a floppy-disk or a ZIP™ disk.

FIG. 2

Figure 2:
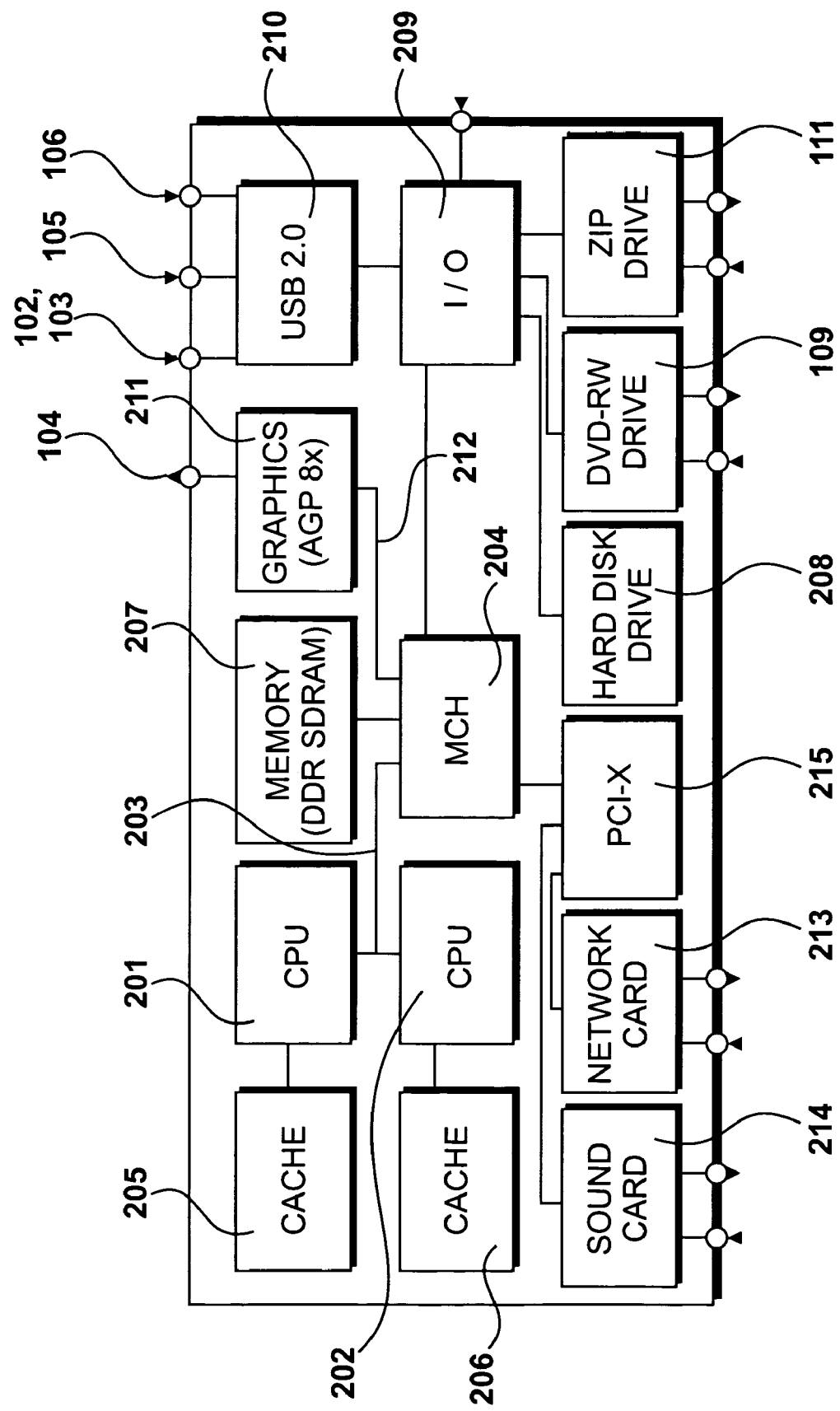
FIG. 2 details the typical hardware components of the computer editing system shown in FIG. 1.

The components of computer system 101 are further detailed in FIG. 2 and, in the preferred embodiment of the present invention, said components are based upon Intel® E7505 hub-based Chipset.

The system includes two Intel® Pentium™ Xeon™ DP central processing units (CPU) 201, 202 running at three Gigahertz, which fetch and execute instructions and manipulate data with using Intel®'s Hyper Threading Technology via an Intel® E7505 533 Megahertz system bus 203 providing connectivity with a Memory Controller Hub (MCH) 204. CPUs 201, 202 are configured with respective high-speed caches 205, 206 comprising at least five hundred and twelve kilobytes, which store frequently-accessed instructions and data to reduce fetching operations from a larger memory 207 via MCH 204. The MCH 204 thus co-ordinates data flow with a larger, dual-channel double-data rate main memory 207, which is between two and four gigabytes in data storage capacity and stores executable programs which, along with data, are received via said bus 203 from a hard disk drive 208 providing non-volatile bulk storage of instructions and data via an Input/Output Controller Hub (ICH) 209. Said ICH 209 similarly provides connectivity to DVD-ROM re-writer 109 and ZIP™ drive 111, both of which read and write data and instructions from and to removable data storage media. Finally, ICH 209 provides connectivity to USB 2.0 input/output sockets 210, to which the stylus 102 and tablet 103 combination, keyboard 105 and mouse 106 are connected, all of which send user input data to system 101.

A graphics card 211 receives graphics data from CPUs 201, 202 along with graphics instructions via MCH 204. Said graphics accelerator 211 is preferably coupled to the MCH 204 by means of a direct port 212, such as the direct-attached advanced graphics port 8X (AGP 8X) promulgated by the Intel® Corporation, the bandwidth of which exceeds the bandwidth of bus 203. Preferably, the graphics card 211 includes substantial dedicated graphical processing capabilities, so that the CPUs 201, 202 are not burdened with computationally intensive tasks for which they are not optimised.

Network card 213 provides connectivity to the framestore 107 by processing a plurality of communication protocols, for instance a communication protocol suitable to encode and send and/or receive and decode packets of data over a Gigabit-Ethernet local area network. A sound card 214 is provided which receives sound data from the CPUs 201, 202 along with sound processing instructions, in a manner similar to graphics card 211. Preferably, the sound card 214 includes substantial dedicated digital sound processing capabilities, so that the CPUs 201, 202 are not burdened with computationally intensive tasks for which they are not optimised. Preferably, network card 213 and sound card 214 exchange data with CPUs 201, 202 over system bus 203 by means of Intel®'s PCI-X controller hub 215 administered by MCH 204.

The equipment shown in FIG. 2 constitutes a typical graphics workstation comparable to a high-end IBM™ PC compatible or Apple™ Macintosh.

FIG. 3

Figure 3:
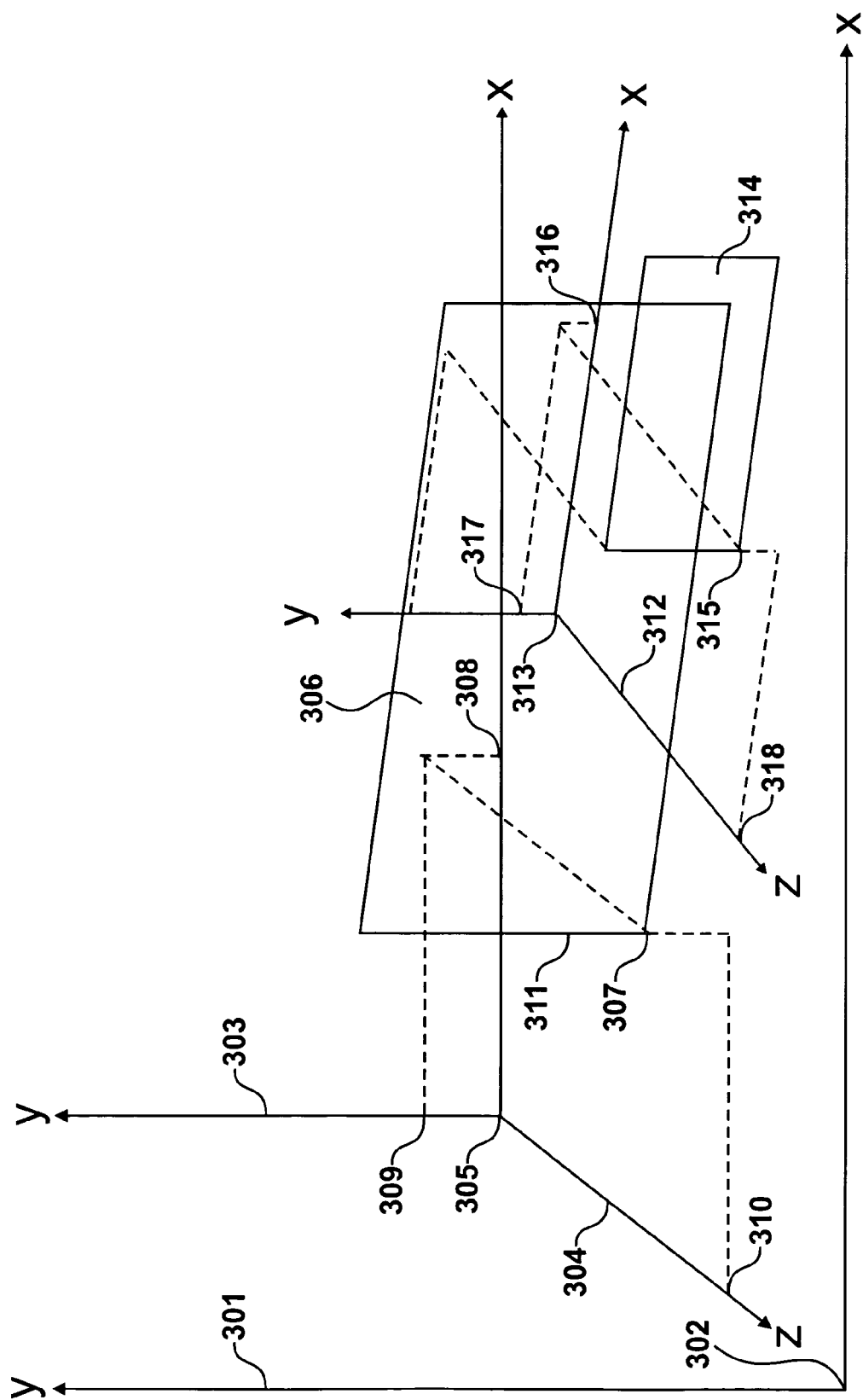
FIG. 3 shows a volume having a canonical reference co-ordinate system and objects therein having respective canonical reference co-ordinate systems.

A plurality of reference co-ordinate systems (RCS) are described in FIG. 3.

A first two-dimensional reference co-ordinate system 301 is known to those skilled in the art as "screen space", RCS 301 for instance corresponds to the two-dimensional display of VDU 104, whereby a third dimension (Z) would extend away from the screen display of said VDU 104 towards artist 100. Traditionally compositing environments conform to RCS 301, wherein any output image data may only be manipulated to the X and Y dimension, whereby the origin 302 of RCS 301 acts as the translation reference center for any two-dimensional objects manipulated therein. A canonical reference co-ordinate system 303 is shown having a third dimension (Z) 304, the origin 305 of which acts as the reference transformation center for any three-dimensional object manipulated therein. Within RCS 303, two-dimensional objects such as an image frame may now be scaled, for instance if they are manipulated away or towards the X or Y segment in the Z 304 dimension. RCS 303 is traditionally referred to by those skilled in the art as the "world space".

A two-dimensional image frame 306 is shown within RCS 303 as a four-sided polygon, one joint 307 of which has X 308, Y 309 and Z 310 co-ordinates within RCS 303. The third dimension 304 of RCS 303 allows for the rotation of image frame 306 about its segment 311 for instance.

A third canonical reference co-ordinate system 312 is shown, the origin 313 of which is defined as the geometrical center of the three-dimensional object defined by image frame 306. In the example, said geometrical center is the intersection of the diagonals respectively extending from the top left to the bottom right corner and top right to the bottom left corner of polygon 306 and the notion of geometrical center is well known to those skilled in the art for three-dimensional objects also having a volume. RCS 312 is known to those skilled in the art as "local space" RCS. That is, the origin 313 is the reference transformation center for processing manipulation of polygon 306 independently of RCS 303. For instance, polygon 306 may be rotated about the X axis, the Y axis, the Z axis or a combination thereof relative to origin 313, the respective X,Y,Z co-ordinates of which would remain unchanged relative to RCS 303.

A second image frame 314 is shown as a four-sided polygon, a corner 315 of which has respective X 316, Y 317 and Z 318 co-ordinates within RCS 312. In this instance, although RCS 312 is the local RCS of image frame 314, it is known as the "parent" RCS of image frame 314. Thus, any transformation applied to image frame 306 as a polygon is propagated to image frame 314, for instance if polygon 306 is scaled up (e.g. enlarged), having the effect of scaling up the X 316, Y 317 and Z 318 of joint 315. In three-dimensional modeling terms, image frame 314 is known as a child of image frame 306, but this does not preclude image frame 314 of having its own geometrical center (not shown) which has respective X,Y,Z co-ordinates in screen space RCS 301, world RCS 303 and parent RCS 312.

The difficulty for compositing artists results from the fact that, irrespective of whether the compositing environment is two-dimensional or three-dimensional, the notion of parent and children object in three-dimensional modeling differs at times substantially from the notion of parent and children objects in image compositing and this difference will be further described below.

FIG. 4

Figure 4:
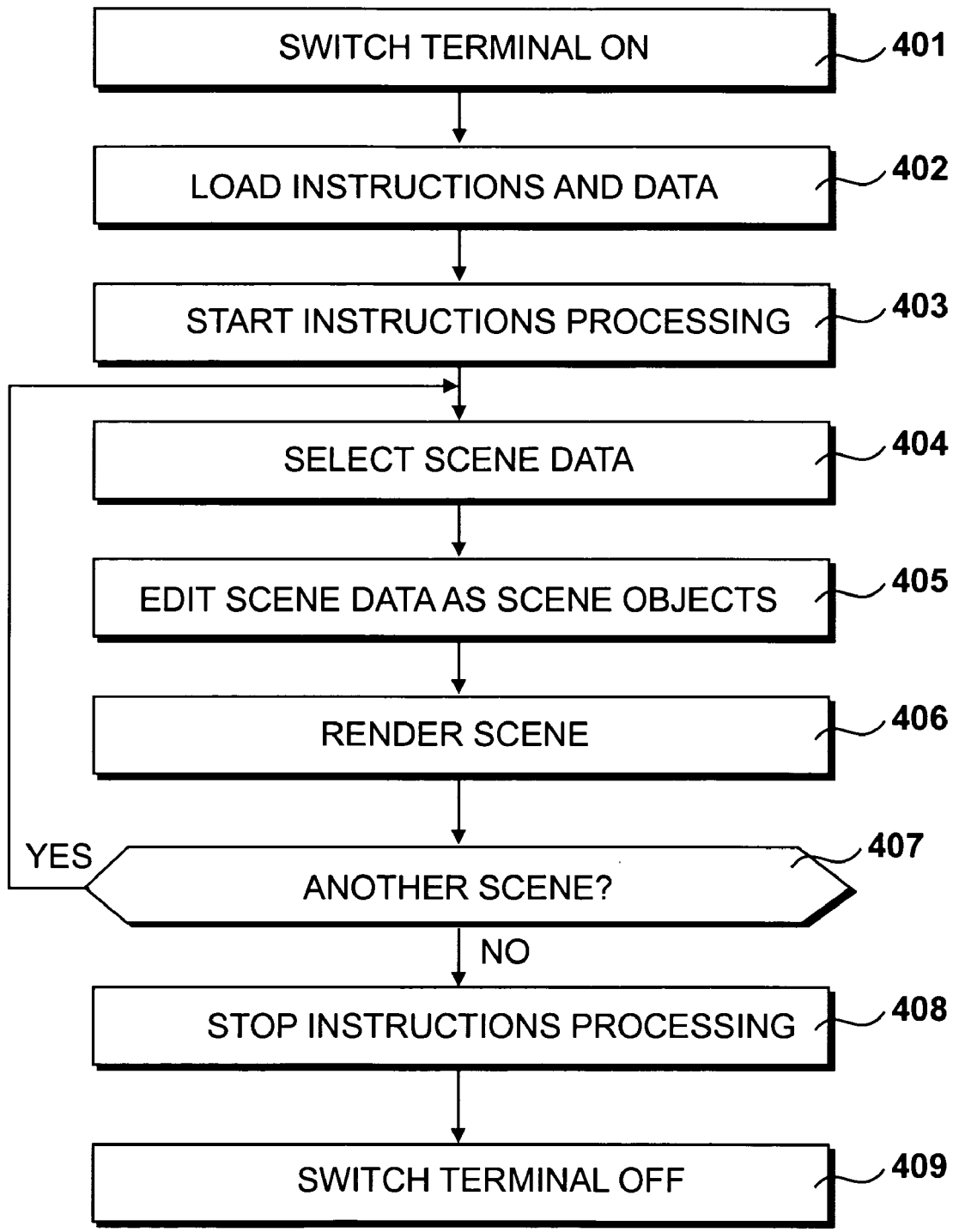
FIG. 4 details the operational steps according to which the artist shown in FIG. 1 may operate the system shown in FIGS. 1 and 2 according to the present invention, including a step of loading a set of instructions and a step of starting the processing thereof.

The processing steps according to which artists 100 may operate the image processing system shown in FIG. 1 are described in FIG. 4. At step 401, artist 100 switches on the image processing system and, at step 402, an instruction set is loaded from hard disk drive 208, DVD ROM 110 by means of the optical reading device 109 or the magnetic disk 112 by means of magnetic reading device 111 or even a network server access by means of network card 213.

Upon completing the loading of step 402 into memory 207, CPUs 201, 202 may start processing said set of instructions, also known as an application, at step 403. User 100 may then select a scene graph at step 404, details of which will be described further below. Upon performing the selection of step 404, artist 100 may now perform a variety of processing functions upon the image data of the scene graph at step 405, whereby a final composite image frame may then output at step 406 by means of rendering the edited scene.

At step 407, a question is asked as to whether the image data of another scene requires editing at step 405 and rendering at step 406. If the question of step 407 is answered positively, control is returned to step 404, whereby another scene may then be selected. Alternatively, if the question of 407 is answered negatively, signifying that artist 100 does not require the functionality of the application loaded at step 402 anymore and can therefore terminate the processing thereof at step 408. Artist 100 is then at liberty to switch off the image processing system 101 at step 409.

FIG. 5

Figure 5:
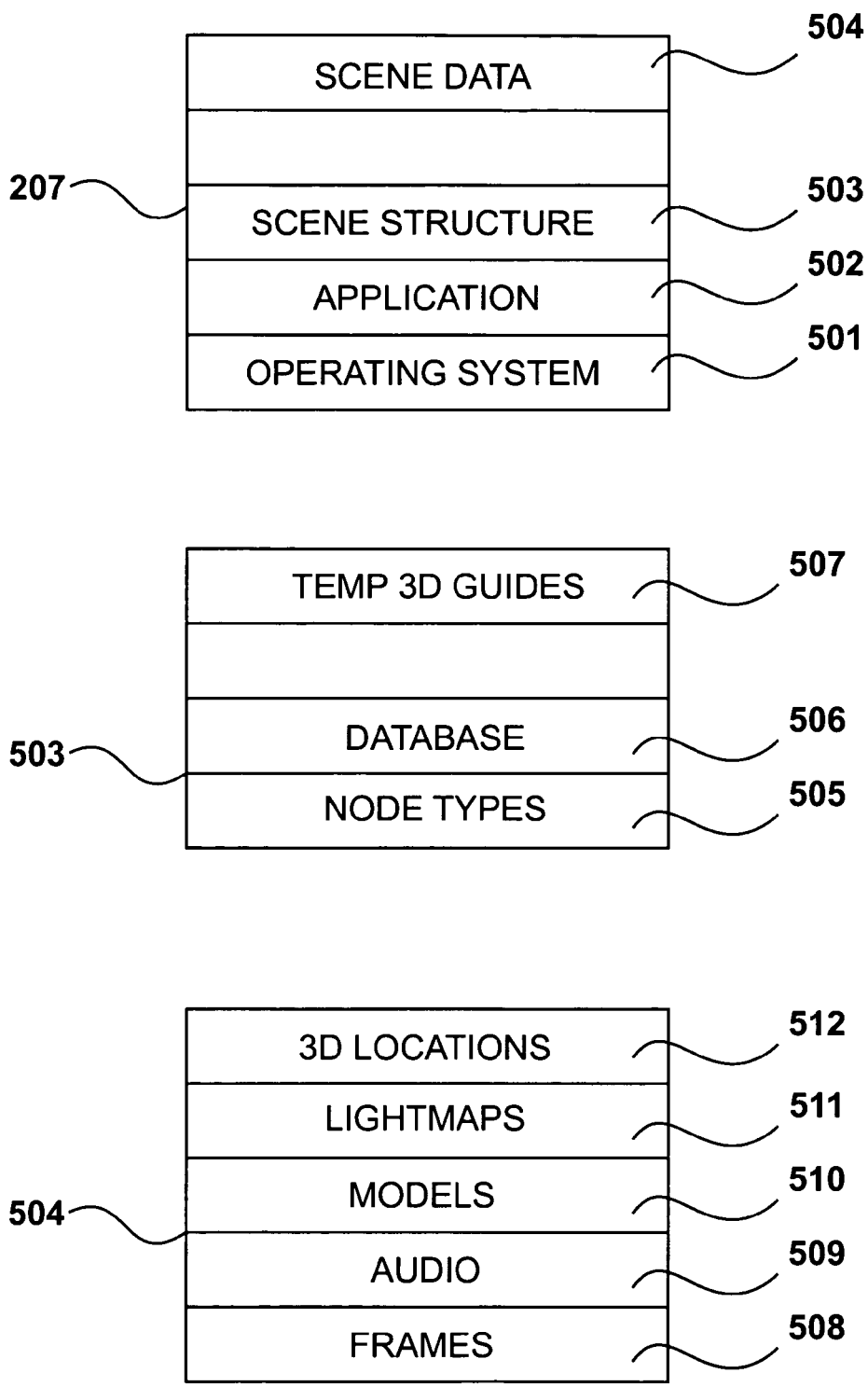
FIG. 5 shows the contents of the memory shown in FIG. 2 subsequently to the loading step shown in FIG. 4.

The contents of main memory 207 subsequently to the selection step 404 of a scene are further detailed in FIG. 5.

An operating system is shown at 501 which comprises a reduced set of instructions for CPUs 201, 202 the purpose of which is to provide image processing system 101 with basic functionality. Examples of basic functions include, for instance, access to files stored on hard disk drive 208 or DVD/CD-ROM 110 or ZIP(™) disk 112 and management thereof, network connectivity with a network server and frame store 107, interpretation and processing of the input from keyboard 105, mouse 106 or graphic tablet 102, 103. In the example, the operating system is Windows XP(™) provided by the Microsoft corporation of Redmond, Calif., but it will be apparent to those skilled in the art that the instructions according to the present invention may be easily adapted to function under different other known operating systems, such as IRIX(™) provided by Silicon Graphics Inc or LINUX, which is freely distributed.

An application is shown at 502 which comprises the instructions loaded at step 402 that enable the image processing system 101 to perform steps 403 to 407 according to the invention within a specific graphical user interface displayed on VDU 104. Application data is shown at 503 and 504 and comprises various sets of user input-dependent data and user input-independent data according to which the application shown at 502 processes image data. Said application data primarily includes a data structure 503, which references the entire processing history of the image data as loaded at step 404 and will hereinafter be referred to as a scene graph. According to the present invention, scene structure 503 includes a scene hierarchy which comprehensively defines the dependencies between each component within an image frame as hierarchically-structured data processing nodes, as will be further described below.

Scene structure 503 comprises a plurality of node types 505, each of which provides a specific functionality in the overall task of rendering a scene according to step 406. Said node types 505 are structured according to a hierarchy 506, which may preferably but not necessarily take the form of a database, the purpose of which is to reference the order in which various node types 505 process scene data 504. Scene structure 503 also temporarily comprises the reference pose layers 507 of the present invention when they are generated and used by artist 100.

Further to the scene structure 503, application data also includes scene data 504 to be processed according to the above hierarchy 503 in order to generate one or a plurality of image frames, i.e. the parameters and data which, when processed by their respective data processing nodes, generate the various components of a final composite image frame.

A number of examples of scene data 504 are provided for illustrative purposes only and it will be readily apparent to those skilled in the art that the subset described is here limited only for the purpose of clarity. Said scene data 504 may include image frames 508 acquired from framestore 107, for instance a background image frame digitized from film and subsequently stored in frame store 107, portraying a TV set and a foreground image frame digitized from film and subsequently stored in frame store 107, portraying a TV presenter.

Said scene data 504 may also include audio files 509 such as musical score or voice acting for the scene structure selected at step 404. Said scene data 504 may also include pre-designed three-dimensional models 510, such as a camera object required to represent the pose of the rendering origin and frustrum of a rendering node within the compositing environment, which will be described further below in the present description. In the example, scene data 504 includes lightmaps 511, the purpose of which is to reduce the computational overhead of CPUs 201, 202 when rendering the scene with artificial light sources. Scene data 504 finally include three-dimensional location references 512, the purpose of which is to reference the position of the scene objects edited at step 405 within the three-dimensional volume of the scene compositing environment.

FIG. 6

Figure 6:
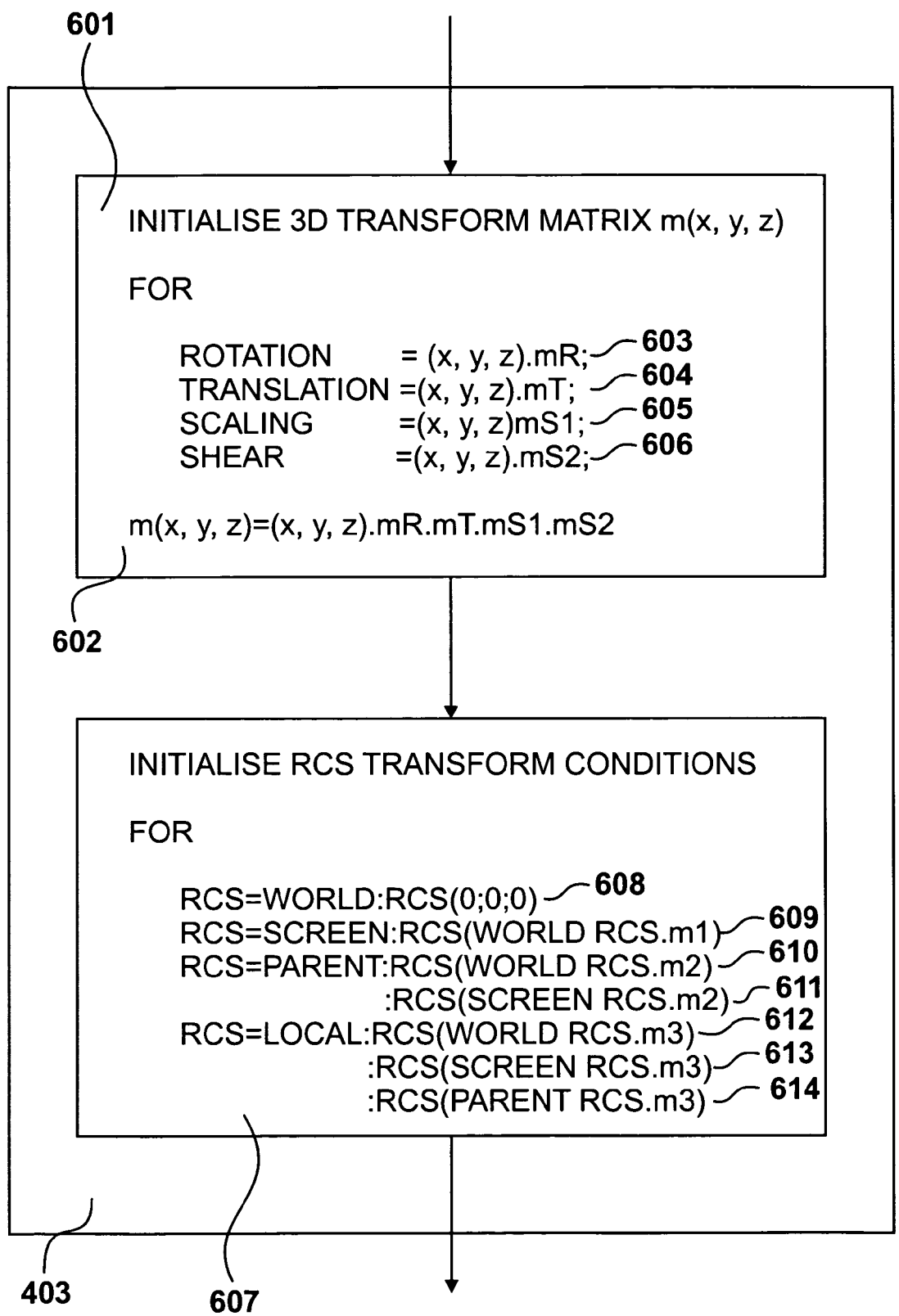
FIG. 6 details the initialization of three-dimensional transformation functions in the starting step shown in FIG. 4.

In order to manipulate the various scene objects 508 to 513 within a three-dimensional compositing environment and manipulates said objects therein, application 502 must initialize three-dimensional transformation functions and respect reference co-ordinate systems and said initialization is performed when CPUs 201, 202 start processing said application at step 403 and further described in FIG. 6.

At step 601, application 502 first initializes a three-dimensional transform matrix M (X, Y, Z). In the preferred embodiment of the present invention, said matrix M is the concatenation 602 of a plurality of specific geometric transformation matrices including a rotation transform matrix MR 603, a translation matrix transform matrix MT 604, a scaling transformation matrix MS1 605 and a sheer transformation matrix MS2 606.

Said matrices 602 to 606 are preferably 4×4 transformation matrices but, in an alternative embodiment of the present invention, said matrices are 3×3 transformation matrices. Irrespective of the number of factors of said matrices, matrices MR, MT, MS1 and MS2 are standard three-dimensional transformation matrices and may transform a three-dimensional object in relation to any three-dimensional RCS. Consequently, at step 607, application 502 next initializes RCS transform condition in order to define the various conformation matrices applied to the pose of a three-dimensional object, depending upon the RTS chosen as its center of its transformation. The pose of an object may be defined as its rotation, translation, scaling and/or sheer transformation values at any given time in relation to an RCS.

Conformation matrices are pre-set three-dimensional transform matrices Mn translating the pose of a three-dimensional object from a given RCS to another.

In the preferred embodiment of the present invention, application 502 defines a 3-D compositing environment configurable with four RCS, but it will be easily understood by those skilled in the art that the functionality of the present invention is not limited thereto and that many more discreet RCS may be implemented.

Thus, the world RCS is generated as the default RCS of the 3-D compositing volume at 608 and a first conformation matrix M1 is declared for transforming world pose value to the screen RCS at 609. Similarly, a second conformation matrix M2 is declared for transforming world pose values at 610 or screen pose values at 611 to the parent RCS. Likewise, a third conformation matrix M3 is declared to conform world pose values at 612, screen pose values at 613 and parent pose values at 614 to the local RCS. Upon completing steps 601 and 607, application 502 may now output a representation of the initialized 3-D compositing environment and three-dimensional objects 508 to 513 therein in a graphical user interface.

FIG. 7

Figure 7:
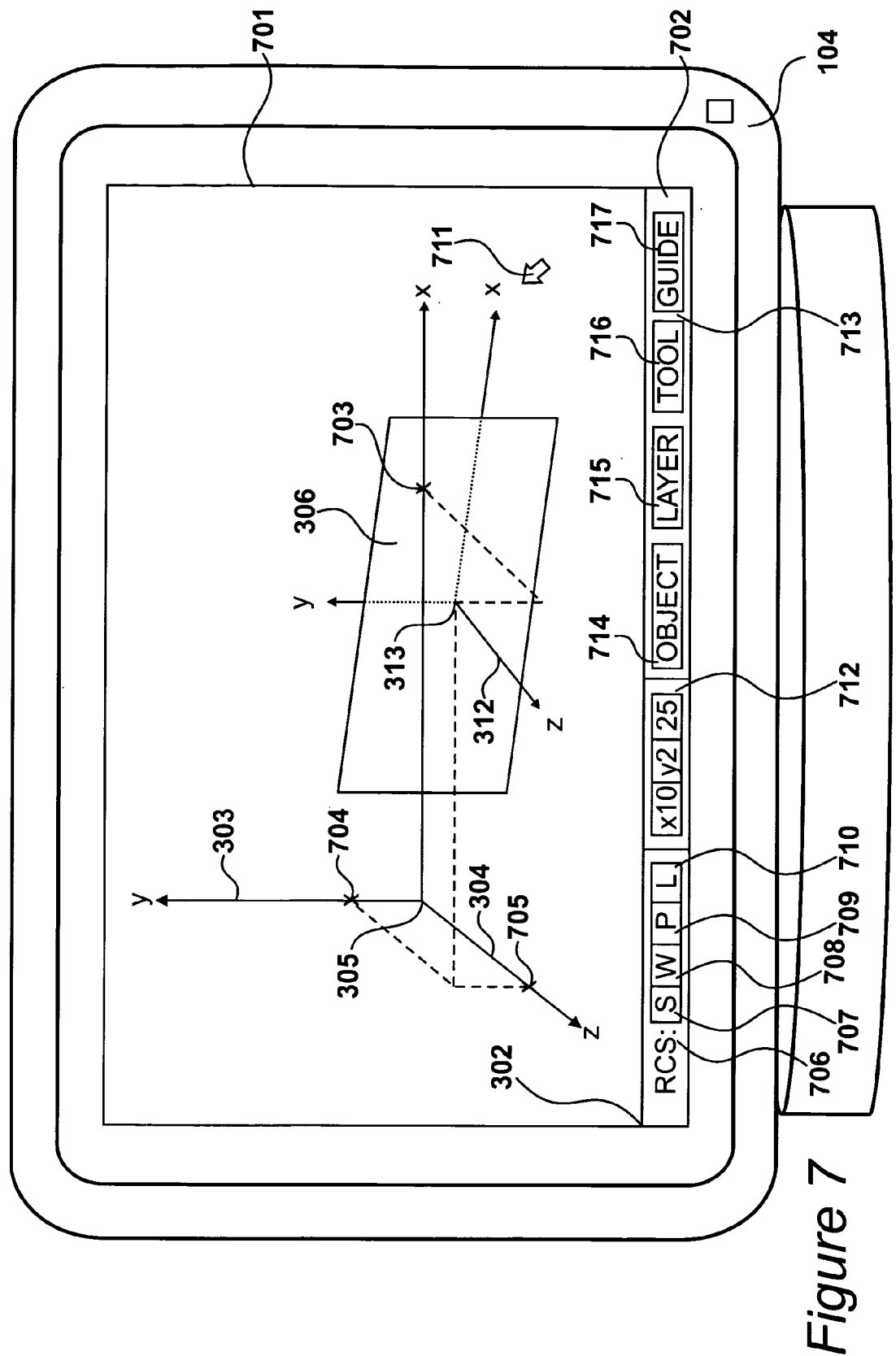
FIG. 7 illustrates a three-dimensional compositing volume output by the application shown in FIG. 5 to a display device shown in FIG. 1.

A representation of the graphical user interface of application 502 is shown in FIG. 7 which includes a three-dimensional compositing environment having an image frame therein and a plurality of user-operable representations of processing functions known to those skilled in the art as widgets.

VDU 104 is shown, the display of which is configured with a compositing environment display portion 701 and a function selection display portion 702. The origin 302 of the screen space of compositing environment is the bottom-left corner of display portion 701 but the compositing environment therein is defined as a volume having a world RCS 303 configured with an origin 305. The artist 100 operating image processing system 101 is therefore intuitively aware of the third dimension 304 of the three-dimensional compositing environment. The image frame 306 is shown within said environment as a four-sided polygon having a local RCS 312, the origin 313 of which has respective X 703, Y 704 and Z 705 co-ordinates in the world RCS 303.

Within the function selection portion 702, a first area 706 provides four user-operable widgets 707 to 710 which, when individually selected by the user by means of a pointer 711, respectively let said user select the screen RCS, world RCS, parent RCS or local RCS as the reference transformation center. In the preferred embodiment of the present invention, said pointer 711 is translated across the display of VDU 104 within portion 701 or portion 702 by means of the two-dimensional planar movement applied by the artist to mouse 106 or stylus 102 on tablet 103 and operates selection of three-dimensional objects within said portion 701 or activation of widgets within said portion 702 by means of conventional dragging and/or clicking.

Within said portion 702, a second area 712 displays the respective X, Y and Z co-ordinates of the geometric center of the three-dimensional objects or group thereof currently selected in relation to the RCS currently selected. In the example, the user selects image frame 306 with pointer 711, having selected the world RCS 303, whereby the X 703, Y 704 and Z 705 co-ordinates of its geometric center which is also the origin 313 of its local RCS 312 are displayed in portion 712.

A third portion 713 is configured with three user-operable widgets 714 to 716, wherein user selection of the object widget 714 instructs application 502 to output detailed object characteristics, for instance in the form of a pop-up window superimposed over portion 701, portion 702 or a combination thereof. User selection of layer widget 715 instructs application 502 to generate a new layer object according to the present invention and, similarly, user selection of tool widget 716 instructs application 502 to generate a new tool layer, within the compositing environment shown in portion 701.

FIG. 8

Figure 8:
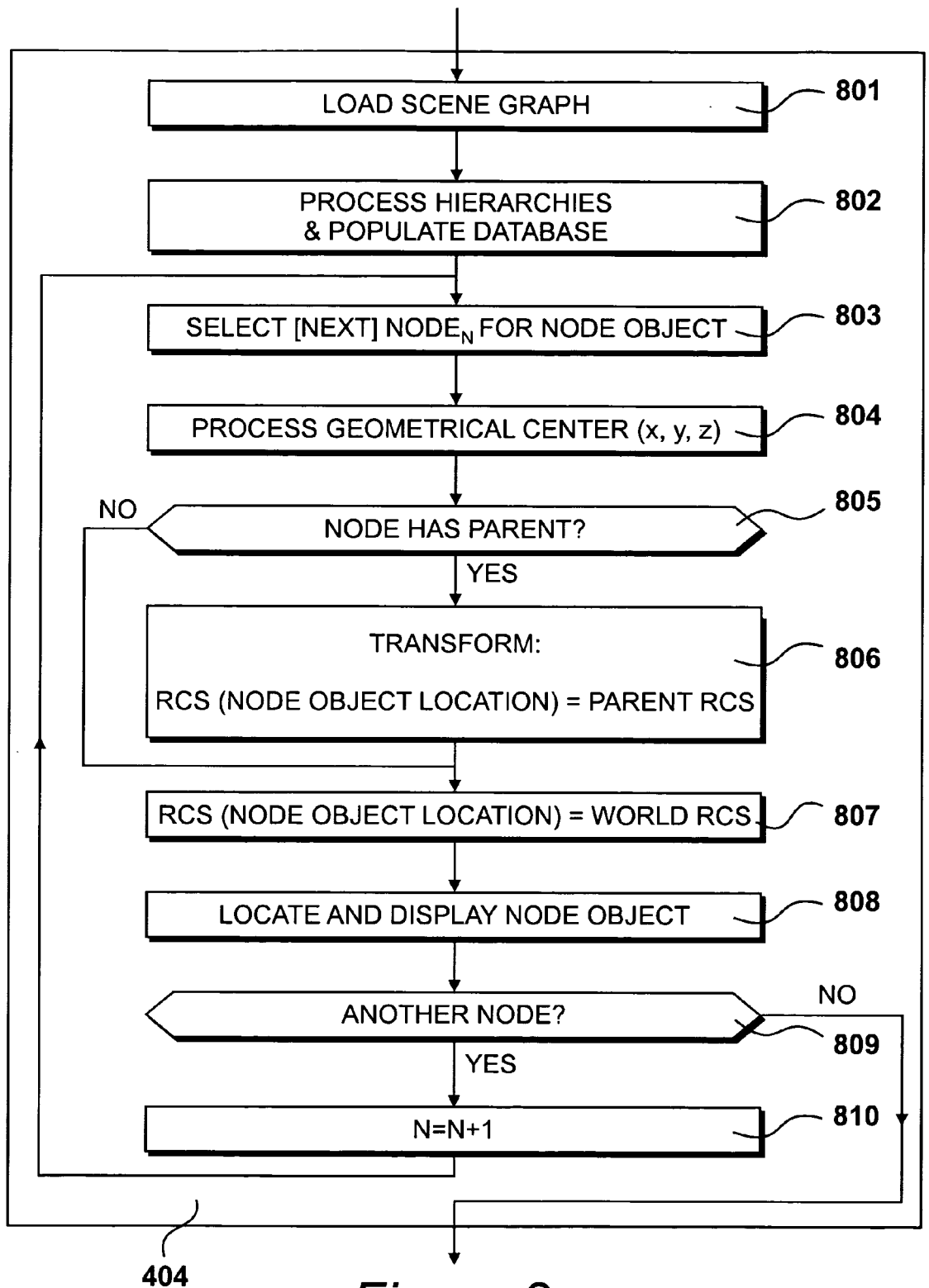
FIG. 8 details the processing steps according to which the application shown in FIGS. 4 to 7 processes a scene graph upon the selection thereof shown in FIG. 4.

The image frame 306 is described within the graphical user interface of application 502 for the purpose of illustrating multiple RCS within the context of a compositing environment as described in FIG. 3, whereby upon completing the application starting step 403, the graphical user interface of application 502 only contains an empty 3-D compositing environment within display portion 701. The artist should preferably select a scene graph at the next step 404, which is further described in FIG. 8.

At step 801, the artist selects a scene graph comprising a scene structure 503 and scene data 504, which are for instance stored in frame store 107 and subsequently loaded into main memory 207 at step 801. At step 802, application 502 processes the hierarchies defined by the scene structure 503 in order to populate the database 506 with references derived from node types 505 and the scene data 504 that each of said referenced nodes respectively processes and outputs. At step 803, application 502 selects a first node in the order specified by said database 506 in order to generate a displayable three-dimensional object therefrom to be eventually located and displayed within the compositing environment shown at step 701. Thus, application 502 first processes said node objects to derive its geometrical center and the three-dimensional co-ordinates thereof in relation to the default RCS 304 at step 804.

At step 805, the question is asked as to whether said selected node has a parent node. In effect, application 502 looks up database 506 and the hierarchy referenced therein to answer question 805, whereby if said question is answered positively, the world RCS co-ordinate of the child node are transformed with conformation matrix 610 at step 806 into three-dimensional co-ordinates in the parent RCS (e.g. RCS 312 in FIG. 3) of its parent node. Alternatively, the question of step 805 is answered negatively, whereby it is determined at step 807 that the reference co-ordinate system in relation to which the object generated at step 803 should be located is the default world RCS 304. Consequently, the 3-D object is located by means of its geometrical center 3-D co-ordinates in relation to a world RCS 304 or its parent RCS and displayed within 3-D compositing environment shown at 701 at step 808.

At step 809, a second question is asked as to whether another node remains to be processed according to steps 803 to 808. If the question of step 809 is answered positively, the node reference counter is incremented at step 810 and control is subsequently returned to step 803, whereby said next node may be selected, its geometrical center derived, its relationship to eventual parent node assessed and so on and so forth. Alternatively, the question of step 809 is answered negatively, signifying that all the nodes of the scene graph loaded at step 801 have been processed and their respective three-dimensional objects are represented within the three-dimensional compositing environment such that the artist may then edit any or all of said objects at the next step 405.

FIG. 9

Figure 9:
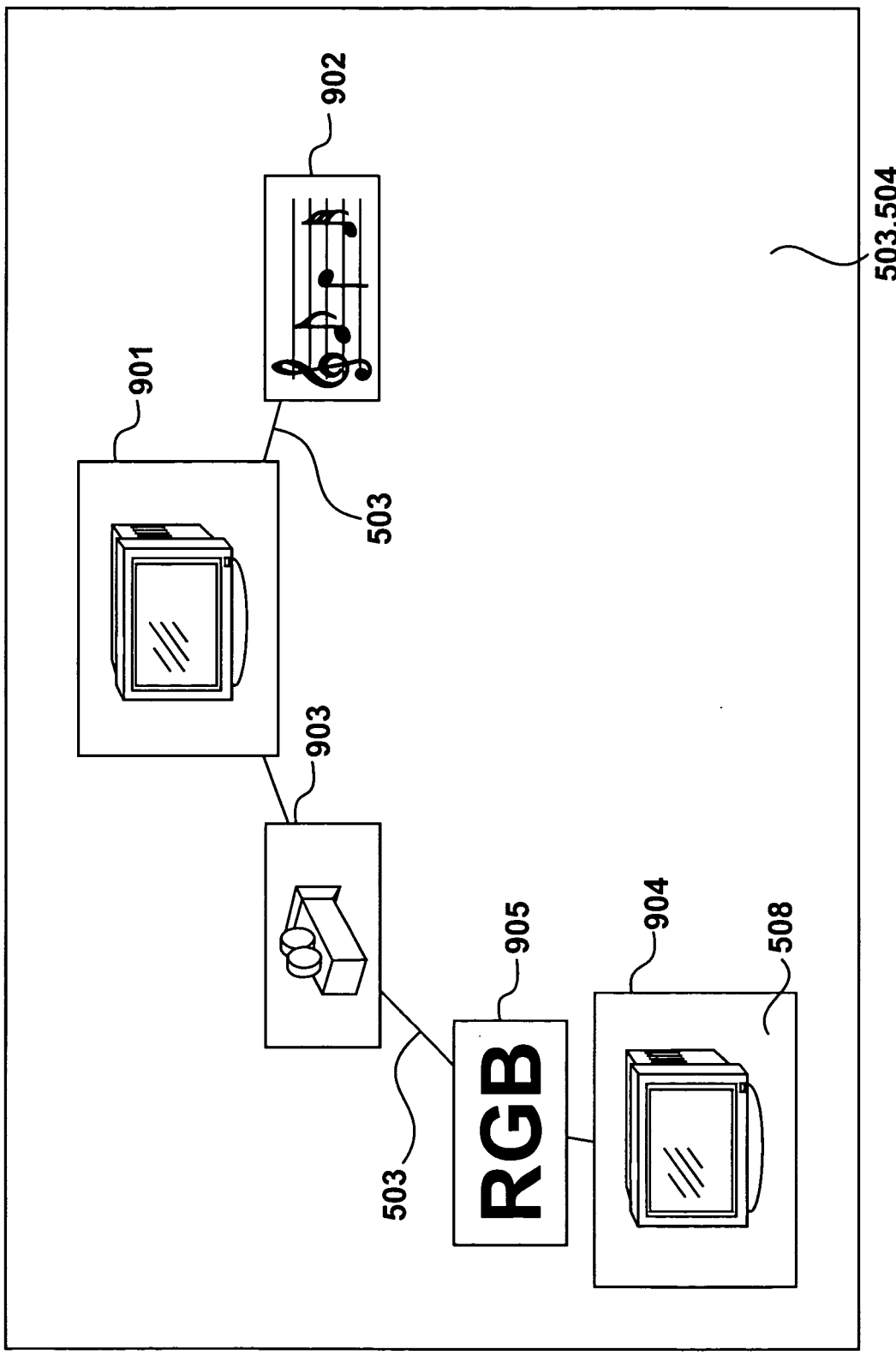
FIG. 9 provides an example of a scene graph shown in FIGS. 5 and 8.

An example of the scene graph loaded at step 801 is illustrated in FIG. 9.

In three-dimensional compositing applications such as application 502, the hierarchy of data processing nodes is traditionally represented as a top-down tree structure, wherein the topmost node 901 pulls all the data output by nodes depending therefrom in order to output final output data, some of which will be image data and some of which may be audio data, for instance generated by a first child node 902. In order to generate image data, a fundamental requirement is the positioning of a "rendering" camera and the definition of its view frustrum, as defined by rendering a node 903. Indeed, the purpose of a compositing application remains to output a two-dimensional, final composite image frame.

Transposing the traditional 2-D compositing of background and foreground frames such as TV set background 508 generated by node 904 into the third dimension therefore involves the concurrent manipulation and positioning of the 3-D representation of such an image frame as a flat plane and the 3-D representation of the camera and its frustrum within a volume. In the example if the R,G,B color component values of said image frame 508 require correction before said frame is rendered, an additional color-correction node 905 pulls the image data output by frame node 904 in order to process it and effect said correction before rendering node 903 can render said color-corrected frame 508.

The scene graph shown in FIG. 9 is very small and is restricted for the purpose of not obscuring the present description. However, it will be readily apparent to those skilled in the art that such scene graphs usually involve hundreds or even thousands of such hierarchical data processing nodes.

FIG. 10

Figure 10:
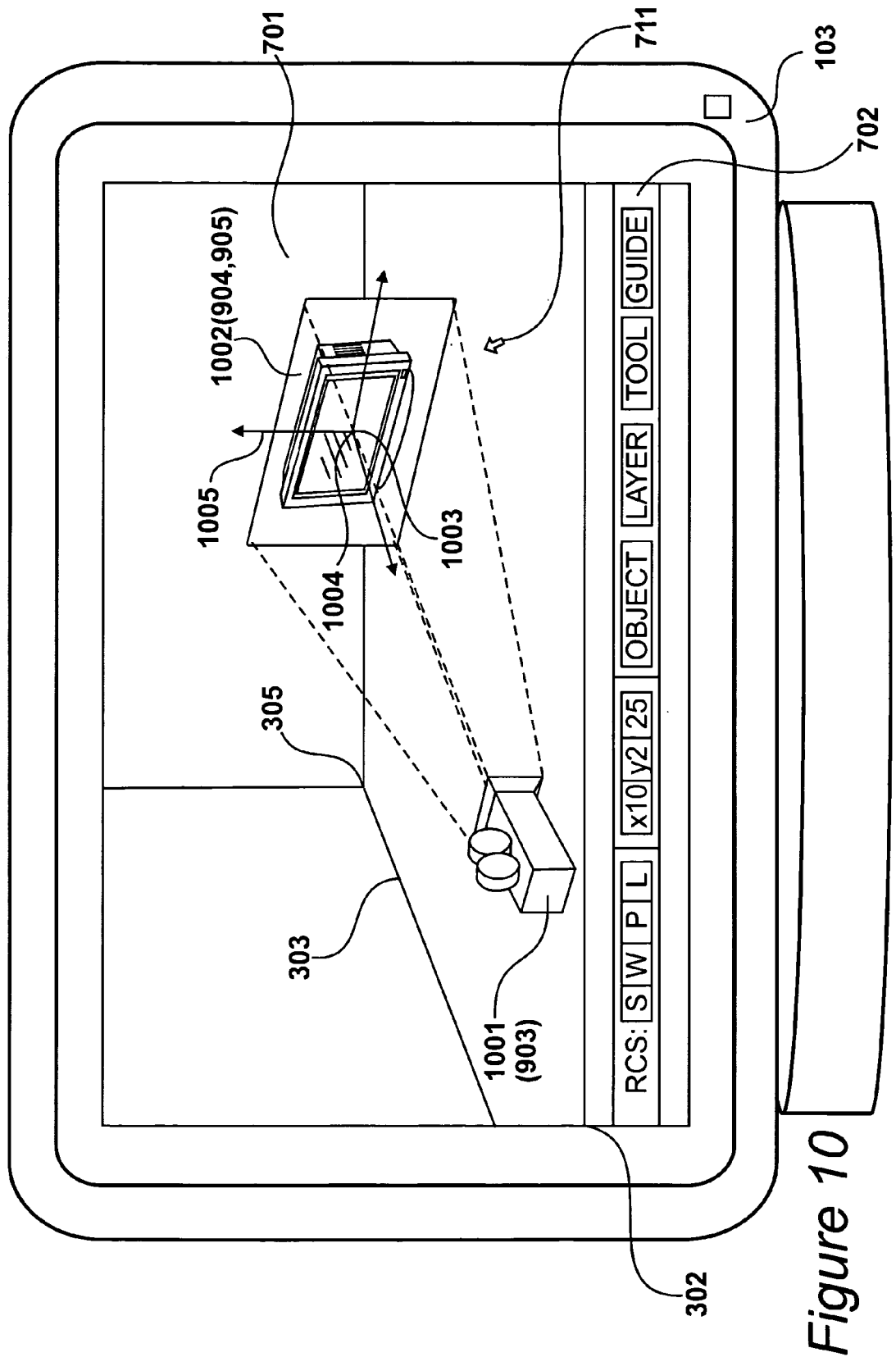
FIG. 10 illustrates the compositing volume shown in FIG. 7 including scene objects shown in FIGS. 8 and 9.

The respective 3-D objects generated by application 502 within the 3-D compositing environment shown at 701 according to step 404 are illustrated within the graphical user interface of application 502 in FIG. 10.

A stylized camera object 1001 is first generated within the 3-D compositing environment and is located therein by means of its geometrical center (not shown) in relation to world RCS 303, because node 901 cannot be represented within said environment, thus said camera object 1001 has no parent. The artist may however select said camera object with pointer 711 and manipulate said object within portion 701 in order to relocate object 1001 within the environment, whereby various 2-D input processing algorithms well known to those skilled in the art may process the X, Y two-dimensional input imparted by means of mouse 106 or stylus and tablet 102, 103 in order to effect said manipulation in relation to the world origin 305, i.e. modify the X, Y and Z co-ordinates of the geometrical center of object 1001.

Alternatively, the artist may select widget 707, whereby the co-ordinates of the geometrical center of object 1001 are transformed by conformation 609 such that 2-D input only translates the camera object 1001 in relation to origin 302. If artist 100 selects widget 710, however, the geometrical center (not shown) of camera object 1001 becomes the RCS, e.g. the world RCS co-ordinates of object 1001 are conformed by conformation matrix 612 or, if the artist subsequently selected the screen RCS as previously described, the screen co-ordinates of said geometrical center are conformed by conformation matrix 613, such that said 2-D input is processed to impart manipulation of object 1001 about its geometrical center only.

A second 3-D object 1002 is displayed within portion 701 representing the image frame output of node 904, which is a four-sided polygon having frame 508 mapped thereto as a polygon texture and has no depth. Node 904 is a child of rendering node 903, hence it is located within world 303 by means of transforming the world RCS co-ordinate values of its geometrical center 1003 according to step 806, i.e. conforming its world co-ordinate values with conformation matrix 610. However, upon the artist selecting widget 710 will result in yet again conforming the 3-D co-ordinates of geometric center 1003 first conformed at 806 with conformation matrix 614, whereby said artist may now manipulate said object 1002 relative to the origin 1004 of its local RCS 1005. In accordance with the description of the present invention, however, any interaction locally imparted upon object 1002 will not be propagated to camera object 1001. Conversely, however, any interaction imparted to camera object 1001 will be propagated to image frame object 1002. For instance, selecting the screen RCS and selecting the camera object 1001, then dragging camera object 1001 towards the right of the screen will similarly drag object 1002 towards the right of the screen, because object 1002 is a child of object 1001.

FIG. 11

Figure 11:
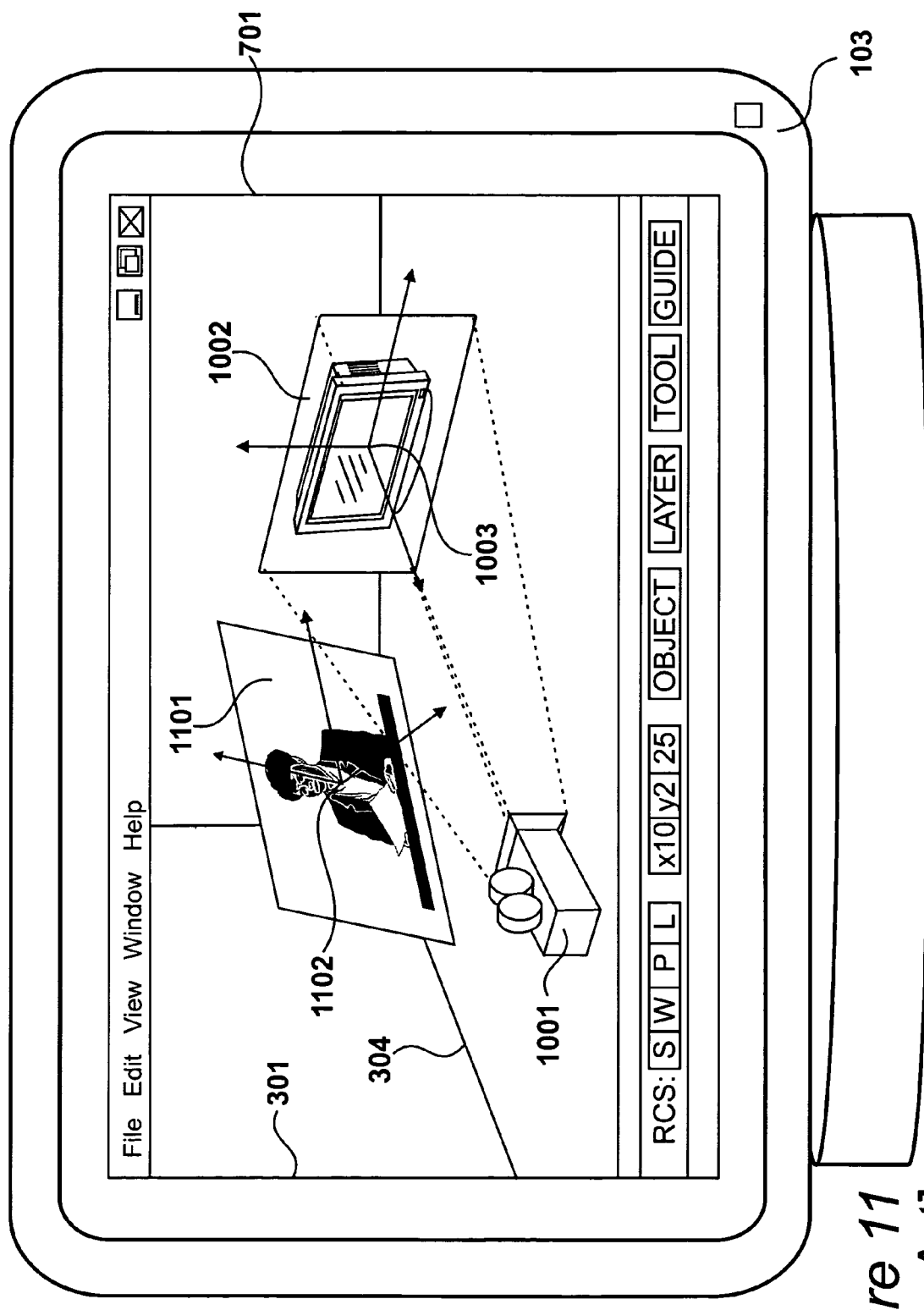
FIG. 11 shows the environment shown in FIG. 10, wherein the artist shown in FIG. 1 manipulates a foreground image frame as a new layer according to the known prior art.

Within the context of the description of FIG. 10, the difference between the hierarchies of nodes-objects in 3-D modeling and/or animation and image frame compositing is shown in FIG. 11, wherein an artist creates a new frame node, thus its corresponding 3-D object, according to the known prior art.

Camera object 1001 and image frame object 1002 are shown in display portion 701 within the 3-D compositing environment, wherein object 1002 is a background frame portraying a TV set. In the example, the artist creates a new frame node outputting an image frame portraying a TV presenter as a child of rendering node 903. It is preferred that said presenter is composited on the display area of the TV set portrayed in the image frame output by image node 904.

In 2-D compositing environment, the task of precisely aligning the background TV set image frame with the foreground presenter image frame would be relatively simple in that said foreground TV presenter TV frame would be generated as a new layer to be simply aligned onto the target resolution-rendering rectangle (i.e. the NTSC example above) by means of a two-dimensional X, Y translation.

In 3-D compositing environments according to the known prior art, said foreground presenter image frame is generated within the compositing volume as a 3-D object 1101 having a geometrical center 1102 and located arbitrarily within said volume, within close proximity of object 1002 or not. Whilst it would be a relatively simple task for an experienced 3-D artist to perform the required alignment of object 1101 with object 1002 in respect of the frustrum of camera object 1001, because such an artist is skilled in the art of rotating, translating, scaling and shearing three-dimensional objects within a volume, it is comparatively difficult for a compositing artist used to two-dimensional translation manipulation only.

Having regard to the respective poses of object 1101 and 1002 shown in FIG. 11, precisely aligning the foreground frame 1101 with the background frame 1002 would require the compositing artist to first select object 1101, then select the screen RCS in order to translate said object 1101 towards object 1002; then select the local RCS to rotate object 1101 about its geometrical center 1102 in order to achieve a pose identical to the pose of object 1002; if required, select the world RCS in order to adjust the depth co-ordinate of object 1101 to ensure that it is positioned in front (as the foreground image frame) of object 1002, but close enough to said object 1002 within the frustrum of camera object 1001 in order to avoid out-of-focus artifacts. Given the ever-increasing size of such image frames, especially movie image frames that can reach up to 16,000×16,000 pixels, such a precise alignment within a three-dimensional compositing environment is not a trivial task for the 2-D compositing artist used to two-dimensional translation only.

Having regard to the previously-stated difference in hierarchies, the above problem is compounded by the fact that, although artist 100 may want object 1101 to be a child of object 1002 in 3-D modeling terms to simplify the positioning task (because object 1101 would be positioned relative to object 1002 by means of the geometric center of said object 1002 becoming the parent RCS of said object 1101), artist 100 may not however want object 1101 to be a child of object 1002 in compositing terms, because the various image processing functions performed upon the frame data represented as object 1101 should not be applied to the frame data represented as object 1002.

FIG. 12

Figure 12:
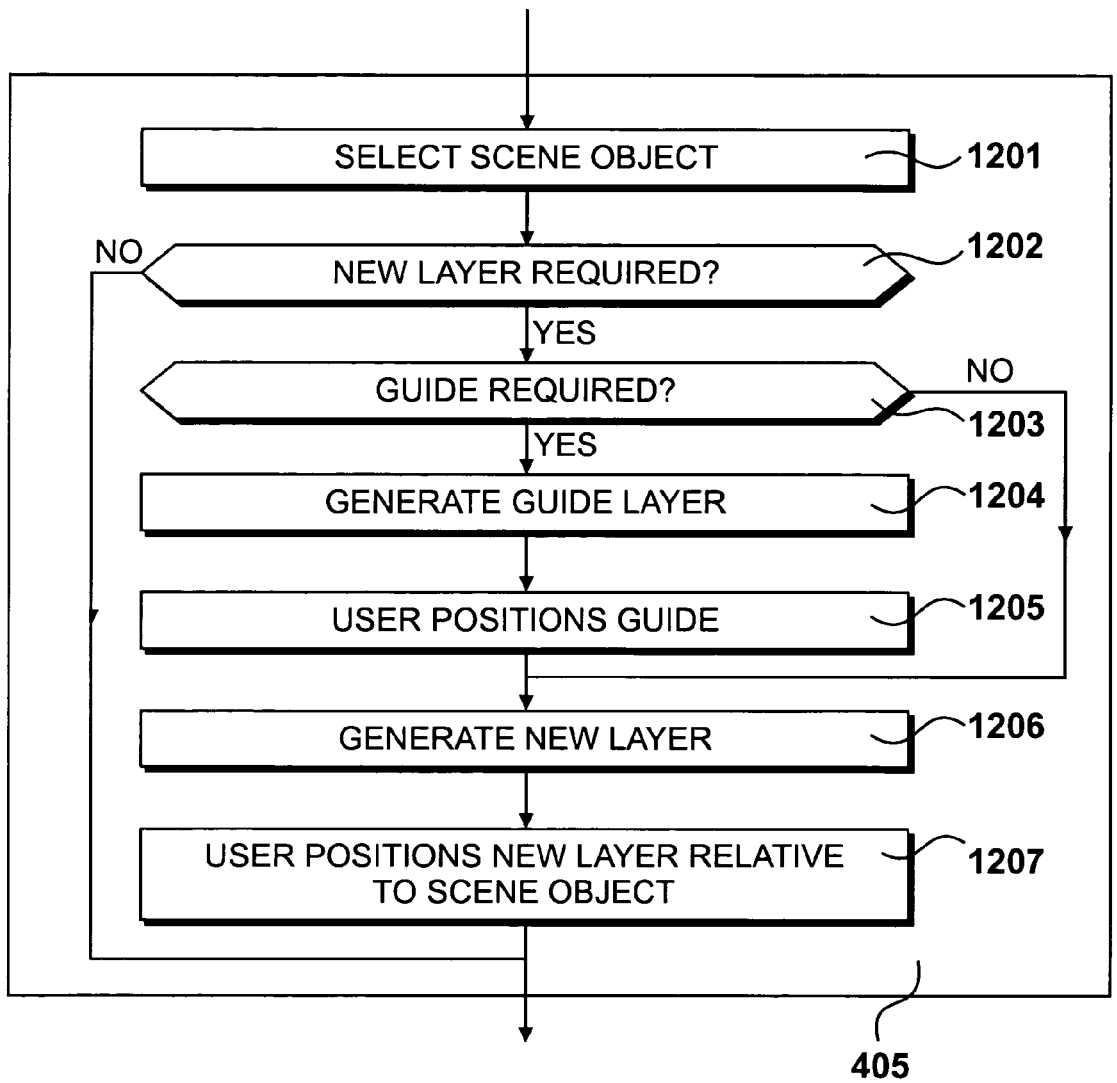
FIG. 12 details the operational steps according to which the artist shown in FIG. 1 edits the image data shown in FIGS. 9 and 10 according to the present invention, including steps of generating and positioning a reference pose layer and steps of generating and positioning a new layer.

The present invention solves the problem introduced and further described in FIG. 11 by providing reference pose layers which act as positioning guides within the three-dimensional compositing environment with which to precisely position and orient a new object such as image frame 1101 by means of simple two-dimensional translation. Preferably, such guides are generated whenever an artist edits image data at step 405, which is further described according to the present invention in FIG. 12.

At 1201, an artist operating processing system 101 configured to the present invention selects a scene object or group thereof, such as TV set image frame object 1002. A first question is asked at step 1202, as to whether a new layer, e.g. a three-dimensional object, is required. If the question of step 1202 is answered positively, as would be the case if the artist wants to generate the foreground image frame object 1101, a second question is asked at step 1203 as to whether a referenced pose layer is required. If the question of step 1203 is answered positively, application 502 generates a referenced pose layer, or guide layer at step 1204 as a 3-D object within display portion 701, but which does not contribute to the final output composite image frame rendered by rendering node 903-camera object 1001. Said artist may interact with said guide within display portion 701 by means of pointer 711 at step 1205 until such time as the guide positioning is satisfactory for the purpose at hand and the new layer required at step 1202 is subsequently generated at step 1206.

Alternatively, the question of step 1203 is answered negatively, for instance if the compositing artist has become sufficiently proficient with three-dimensional manipulation not to require the guide of the present invention anymore or if the task at hand does not require the precision afforded by said guide, whereby control is directly forwarded to step 1206. Upon generating said new required layer at said step 1206, the artist may now position said new layer relative to said guide if a guide was generated according to step 1204 or relative to the scene object selected at step 1201 at the next step 1207.

FIG. 13

Figure 13:
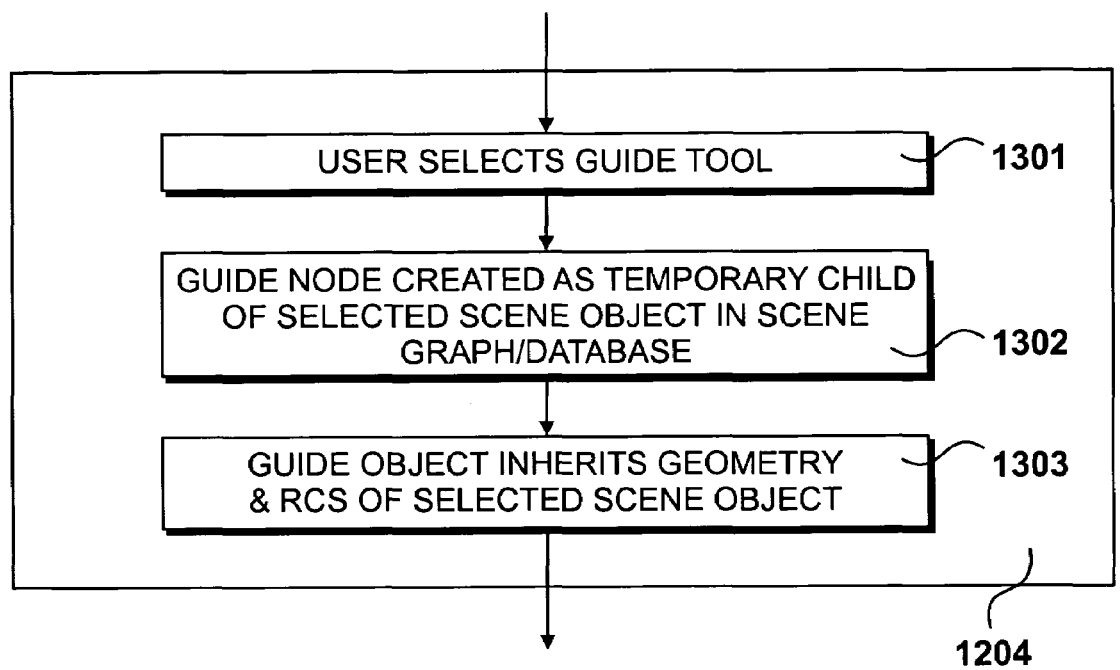
FIG. 13 further details the operational steps according to which the reference pose layer shown in FIG. 12 is generated.

The step 1204 of generating the guide layer of the present invention is further described in FIG. 13.

At step 1301, the artist selects the guide tool within the function representation portion 702 of the graphical user interface of application 502, either by means of point 711 activated by user interaction of mouse 106 or stylus 102 and tablet 103, or a specific key of keyboard 105, known to those skilled in the art as a "hot key". At step 1302, a guide node is created as a temporary child of the scene graph node, the 3-D object representation of which was selected at step 1201 and said guide node is referenced within database 506, whereby the corresponding guide layer generated in the 3-D compositing environment inherits the geometry and the RCS of said selected scene object at step 1303.

Thus, in effect, the guide layer is generated within the three-dimensional compositing environment with the same geometric center as said selected object and the same screen RCS, world RCS, parent RCS and local RCS co-ordinates, whereby any subsequent interaction by the artist of a parent object of said selected object propagates the corresponding transformation to the geometry and geometric center of said guide layer.

FIG. 14

Figure 14:
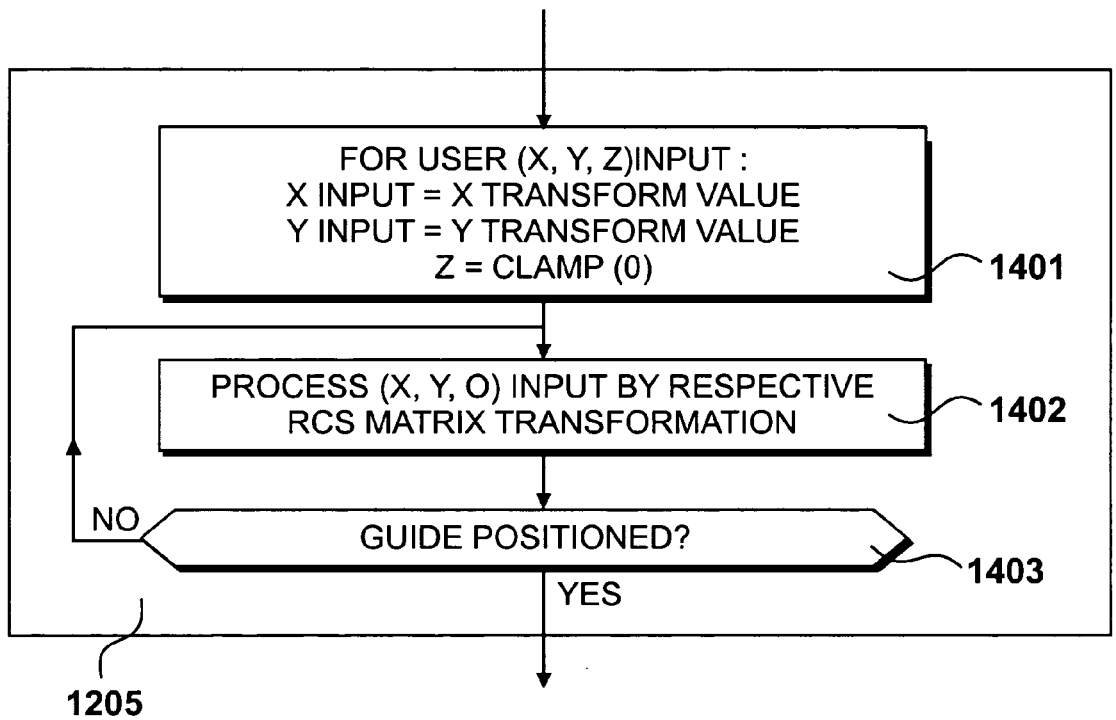
FIG. 14 further details the operational steps according to which the reference pose layer shown in FIGS. 12 and 13 is positioned by the user shown in FIG. 1.

The positioning of the guide layer generated according to steps 1301 to 1303 at step 1205 is further described in FIG. 14.

At step 1401, the user input data input by the artist by means of keyboard 105, mouse 106, stylus 102 with tablet 103 or any combination thereof, is constrained to two-dimensional data only, i.e. the steps (Z) co-ordinate a value of the geometric center of the guide layer is clamped to its current value in the currently selected RCS and corresponding clamped in the conformation matrices if the artist were to select alternative RCS's 707 to 710 prior to generating the new layer at step 1206. Consequently, upon artist 100 selecting the guide layer within display portion 701 for manipulation therein by means of pointer 711, application 502 processes the X input data, Y input data and the Z co-ordinate value clamped at unity with respective mR, mT, mS1 and mS2 transformation matrices at step 1402, wherein said guide layer may only be manipulated along the XY plane of its local RCS, e.g. the XY plane of its parent RCS.

A question is asked at step 1403 as to whether further guide layer positioning input has been received. If the question of 1403 is answered positively, control returns to step 1402, wherein said two-dimensional input data translates said guide layer alongside said XY plane and so on and so forth. Alternatively, if the question of step 1403 is answered positively, signifying that the artist has completed the guide positioning step 1205.

FIG. 15

Figure 15:
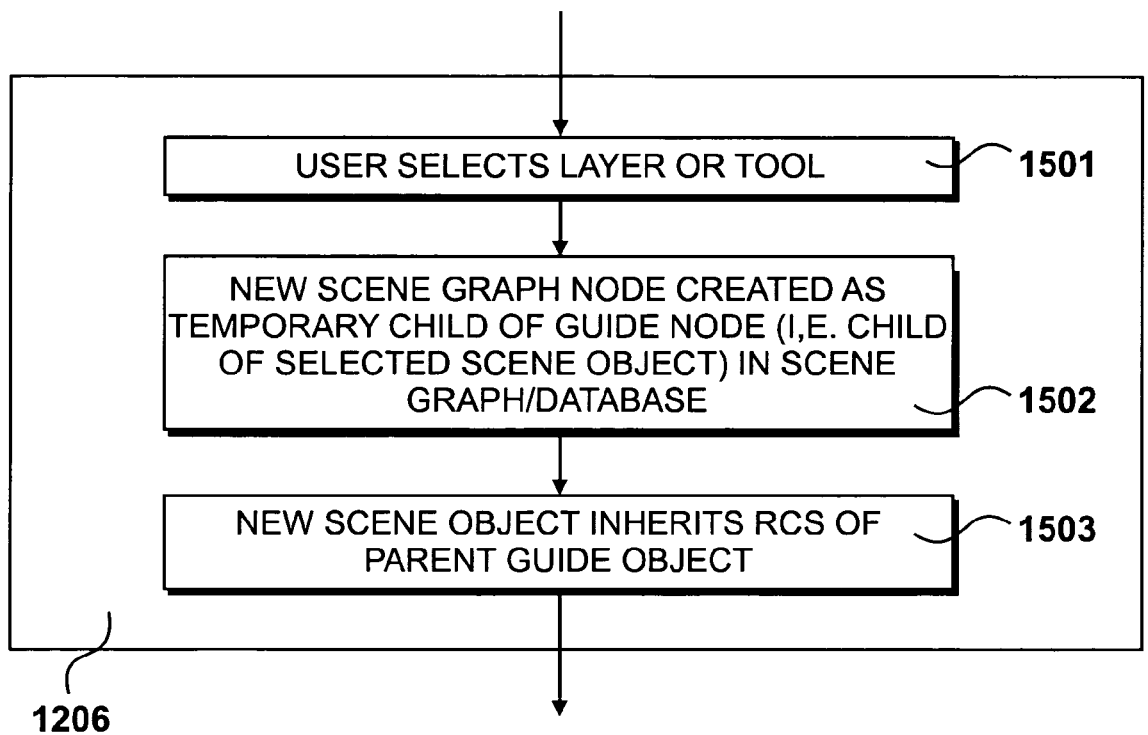
FIG. 15 further details the operational steps according to which the new layer shown in FIG. 12 is generated.

The step 1206 of generating a new layer is further described in FIG. 15.

Irrespective of whether the artist has generated a guide layer at step 1204 and positioned it at step 1205 according to the present invention, at step 1501 said user selects a new layer or a new tool, for instance respectively by means of positioning pointer 711 over layer widget 715 and activating a mouse button or pressing a hot key or tapping stylus 102 on tablet 103, or by means of positioning pointer 711 over tool widget 716 and, similarly, effecting a mouse click or pressing a hot key or again, tapping stylus 102 on tablet 103.

At step 1502, a new scene graph node is created as a temporary child of the guide node created at step 1302 if a guide node was generated at step 1204 or, alternatively, said new scene graph node is created as a node of the scene graph selected at step 801, whereby it is registered in database 506 like the guide node at step 1302.

At step 1503, the three-dimensional object corresponding to the layer or tool selected at step 1501 and registered within the scene graph at step 1502 inherits the RCS of its parent, which is the guide layer if it was generated according to steps 1301 to 1303 or the world RCS of the scene graph selected at 801 if said guide was not generated.

FIG. 16

Figure 16:
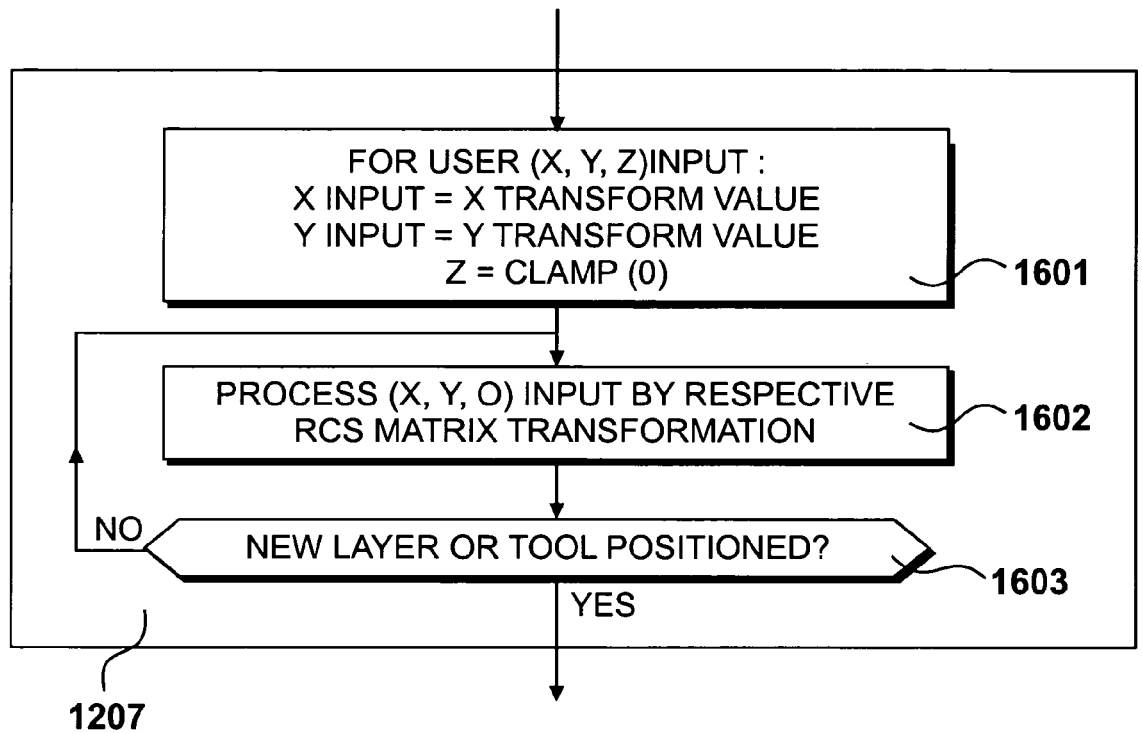
FIG. 16 further details the operational steps according to which the new layer shown in FIGS. 12 and 15 is positioned by the user shown in FIG. 1.

The step 1207 of positioning a new layer relative to a scene object is further described in FIG. 16.

At step 1601, the user input data input by the artist by means of keyboard 105, mouse 106, stylus 102 with tablet 103 or any combination thereof, is constrained to two-dimensional data only, i.e. the steps (Z) co-ordinate a value of the geometric center of the guide layer is clamped to its current value in the currently selected RCS and corresponding clamped in the conformation matrices if the artists were to select alternative RCS's 707 to 710 prior to generating the new layer at step 1206. Consequently, upon the artist selecting the new layer or tool within display portion 701 for manipulation therein by means of pointer 711, application 502 processes the X input data, Y input data and the Z co-ordinate value clamped at unity with respective mR, mT, mS1 and mS2 transformation matrices at step 1602, wherein said new layer or tool may only be manipulated along the XY plane of its local RCS, e.g. the XY plane of its parent RCS.

A question is asked at step 1603 as to whether further input data has been received to position the new layer or tool. If the question of 1603 is answered positively, control returns to step 1602, wherein said two-dimensional input data translates said new layer or tool layer alongside said XY plane and so on and so forth. Alternatively, if the question of step 1603 is answered positively, signifying that the artist has completed the new layer or tool positioning step 1205.

FIG. 17

Figure 17:
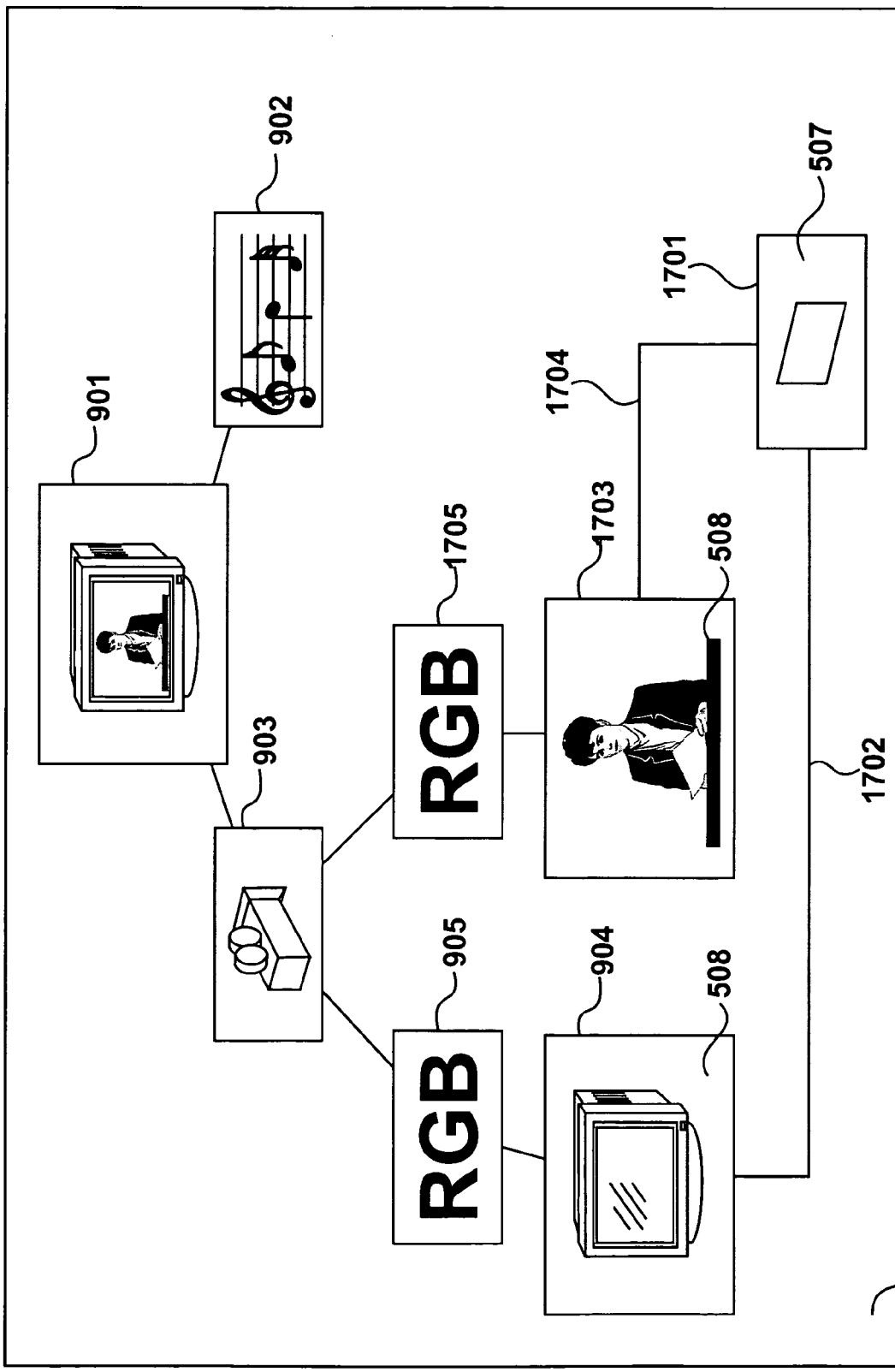
FIG. 17 shows the scene graph described in FIG. 9 wherein a reference pose layer and a new layer shown in FIGS. 12 to 16 have been inserted.

The scene graph of the example first described in FIG. 9 is shown in FIG. 17 wherein a guide layer was generated and registered therein according to step 1302 and a new layer subsequently generated a temporary child thereof according to step 1502.

Referring back to FIG. 10, the artist is satisfied with the pose of image frame 1002 and the pose of camera object 1001 within the 3-D compositing environment and now requires to generate a new layer within said environment, which is the presenter foreground image frame to be composited within the screen display area of the TV set shown in image frame 1101 as described in FIG. 11.

According to the present invention, said artist selects the guide tool at step 1301 by means of positioning pointer 711 over the guide widget 717 and effects a mouse click, whereby a guide node 1701 is generated within scene graph 503, 504 as a child of the background image frame object 904 said artist selected at step 1201, whereby said child dependency is shown at 1702.

The guide layer 507 output by guide node 1701 inherits the geometry and RCS of object 904, thus the guide object generated within the 3-D compositing environment is not only a child of object 904 but also a child of camera object 903.

Upon completing the positioning step 1205, the artist subsequently selects the layer tool, for instance by means of translating pointer 711 over the layer widget 716 and effecting a mouse click, wherein a node 1703 is created within scene graph 503, 504 as a frame node outputting an image frame 508 as a child of guide node 1701, shown at 1704.

Frame node 904 is defined within scene graph as a child of rendering node 903 and guide node 1701 is similarly defined within said scene graph as a child node of said rendering node 903, as it is itself a child of frame node 904. Similarly, frame node 1703 is a child of rendering node 903, as it is itself a child of guide node 1701. The temporary nature of said guide node 1701 however, ensures that any layer or tool positioned in relation to the 3-D object 1002 representing frame node 904, such as frame node 1703, does not necessarily remain a child node thereof from the moment of its inception thereon. Indeed, the image frame data 508 output by frame node 1703 may require additional color correction from a color correction node 1705 providing the same functionality as color correction node 905 independently of the color correction applied by said color correction node 905 to the image frame data 508 output by frame node 904. In this situation, it would therefore be preferable for frame nodes 904 and 1703 to be respectively children of a rendering node 903 but unrelated themselves.

In order to satisfy this condition, said guide node is temporary in the sense that it only remains in scene graph 503, 504 so long as the artist requires its usability for positioning objects within the 3-D compositing environment, whereby upon completing the alignment of the new layer generated from said frame node 1703 within said 3-D compositing environment, the artist can subsequently again select said guide layer by means of pointer 711 and simply delete it, for instance by means of pressing the "Delete" key of keyboard 105, whereby hierarchical relationships 1702, 1704 are similarly deleted.

FIG. 18

Figure 18:
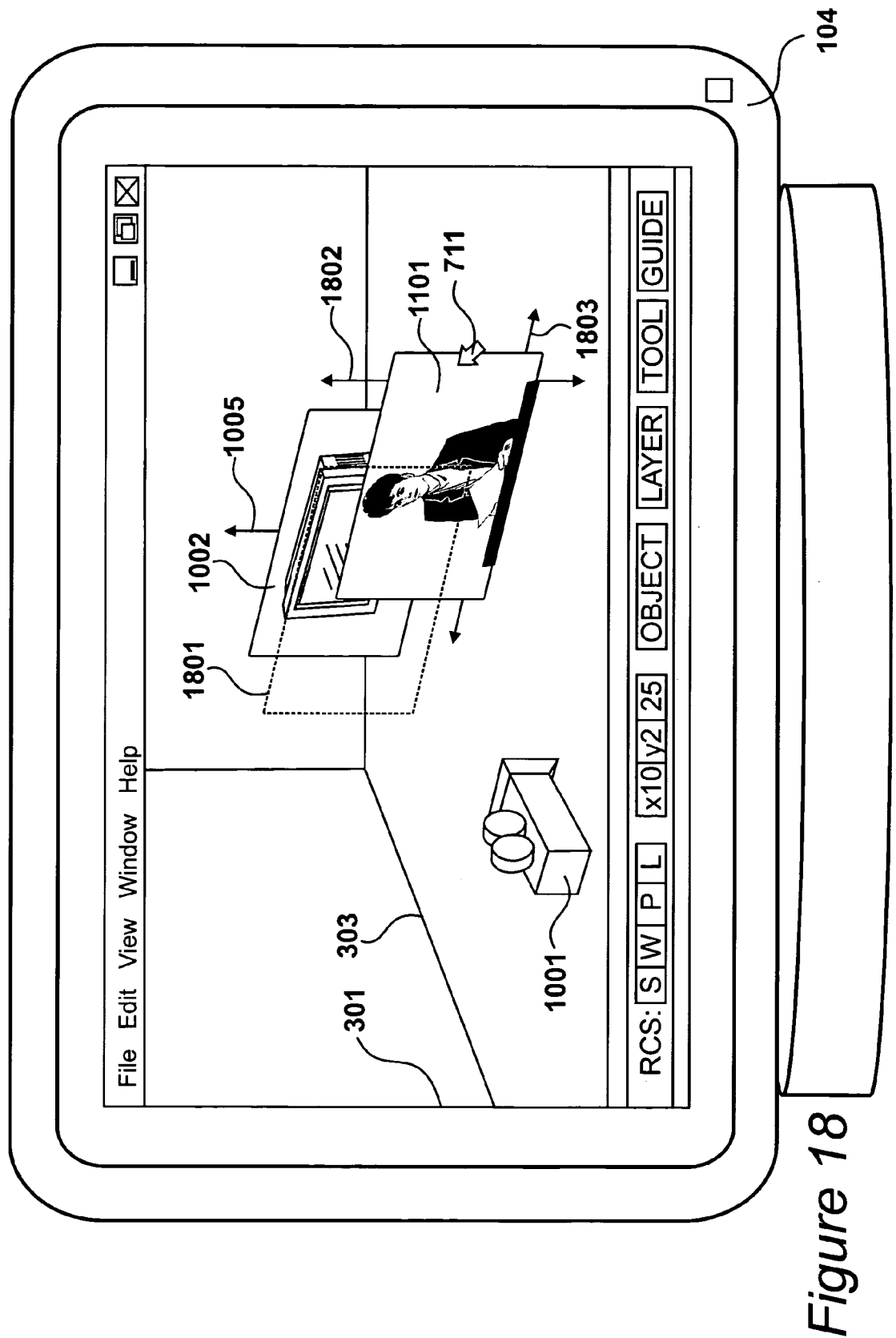
FIG. 18 illustrates the compositing volume shown in FIG. 10 including a reference pose layer shown in FIGS. 12 to 17 and a new layer manipulated by the artist shown in FIG. 1 according to the present invention.

The graphical user interface of application 502 according to the present invention is shown in FIG. 18, having a 3-D compositing environment within which a guide layer was generated and the artist positions a new foreground image frame layer therewith.

The camera object 1001 and the background TV set image layer 1002 are shown within the 3-D compositing environment defined by RCS 303 and screen RCS 301 as shown in FIG. 3. In accordance with the description of the present invention, the artist has positioned pointer 711 over background image layer 1002 for selection according to step 1201, then positioned said pointer 711 over guide widget 717 and effected a mouse click, whereby a reference pose layer 1801 was generated within said 3-D compositing environment as inheriting the geometry, geometric center and RCS of background TV set layer 1002. Said reference pose layer 1801 is shown slightly front of said background layer 1002 relative to camera object 1001 for the purpose of not obscuring the drawing unnecessarily but it will be understood that, in accordance with the description of the present embodiment, said layer has the same layer screen, world, parent and local co-ordinate as said object 1002, in accordance with layer generating step 1204.

Upon generating frame node 1703 within scene graph 503, 504, application 502 outputs the foreground TV presenter image layer 1101 which inherits the geometric center and RCS of guide layer 1801 and, having constrained transformation of foreground layer 1101 in the depth (Z) dimension according to step 1801, the artist may now select said foreground layer 1101 by means of pointer 711 and translate said new layer 1101 relative to the RCS of guide layer 1801, i.e. background 1002, relative to the RCS of said guide layer 1801, i.e. relative to the RCS 1005 of said background layer 1002. The artist can therefore very simply and effectively translate foreground frame 1101 along the vertical axis 1802 and/or the horizontal axis 1803 of said RCS 1005 only in relation to the frustrum of camera object 1001, as would be the case in a traditional 2-D compositing environment with which said compositing artist is most proficient.

The invention claimed is:

1. An apparatus for generating image data in a computer system, comprising:
   (a) a computer system having a memory, a display, and a user input means;
   (b) one or more computer programs, performed by the computer, for:
      (i) defining first image data as a first layer, wherein the first layer has respective co-ordinates within a three-dimensional volume configured with a reference co-ordinate system;
      (ii) positioning second image data relative to said first image data within said volume by generating a reference pose layer as a guide and configuring the co-ordinates thereof as a second reference co-ordinate system within said volume, wherein the reference pose layer is displayed pursuant to an activation of a guide tool by a user;
      (iii) positioning said reference pose layer relative to said first layer for use as a guide for positioning said second image data; and
      (iv) upon selecting said second image data, defining said second image data as said second layer having respective co-ordinates within said three-dimensional volume configured with said second reference co-ordinate system based on the reference pose layer.

2. A method of generating image data comprising:
defining first image data as a first layer, wherein the first layer has respective co-ordinates within a three-dimensional volume configured with a reference co-ordinate system;
positioning second image data relative to said first image data within said volume by generating a reference pose layer as a guide and configuring the co-ordinates thereof as a second reference co-ordinate system within said volume, wherein the reference pose layer is displayed pursuant to an activation of a guide tool by a user;
positioning said reference pose layer relative to said first layer for use as a guide for positioning said second image data; and
upon selecting said second image data, defining said second image data as said second layer having respective co-ordinates within said three-dimensional volume configured with said second reference co-ordinate system based on the reference pose layer.

3. An article of manufacture comprising a program storage medium readable by a computer and embodying one or more instructions executable by the computer to perform a method for generating image data, the method comprising:
defining first image data as a first layer, wherein the first layer has respective co-ordinates within a three-dimensional volume configured with a reference co-ordinate system;
positioning second image data relative to said first image data within said volume by generating a reference pose layer as a guide and configuring the co-ordinates thereof as a second reference co-ordinate system within said volume, wherein the reference pose layer is displayed pursuant to an activation of a guide tool by a user;
positioning said reference pose layer relative to said first layer for use as a guide for positioning said second image data; and
upon selecting said second image data, defining said second image data as said second layer having respective co-ordinates within said three-dimensional volume configured with said second reference co-ordinate system based on the reference pose layer.

4. The apparatus of claim 1 wherein the reference pose layer inherits a geometry and reference coordinate system from a parent object.

5. The apparatus of claim 1 wherein said reference pose layer is a temporary layer that is deleted once the second image data has been positioned.

6. The apparatus of claim 1 wherein the reference pose layer is constrained to two-dimensional data based on an XY plane of a local reference coordinate system of the reference pose layer.

7. The method of claim 2 wherein the reference pose layer inherits a geometry and reference coordinate system from a parent object.

8. The method of claim 2 wherein said reference pose layer is a temporary layer that is deleted once the second image data has been positioned.

9. The method of claim 2 wherein the reference pose layer is constrained to two-dimensional data based on an XY plane of a local reference coordinate system of the reference pose layer.

10. The article of manufacture of claim 3 wherein the reference pose layer inherits a geometry and reference coordinate system from a parent object.

11. The article of manufacture of claim 3 wherein said reference pose layer is a temporary layer that is deleted once the second image data has been positioned.

12. The article of manufacture of claim 3 wherein the reference pose layer is constrained to two-dimensional data based on an XY plane of a local reference coordinate system of the reference pose layer.

* * * * *